(12) United States Patent
Katsuda et al.

(10) Patent No.: US 6,936,303 B1
(45) Date of Patent: Aug. 30, 2005

(54) ELECTRIC TYPE INITIATOR AND GAS GENERATOR

(75) Inventors: Nobuyuki Katsuda, Hyogo (JP); Satoshi Kubozuka, Hyogo (JP); Shingo Oda, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 296 days.

(21) Appl. No.: 09/959,781

(22) PCT Filed: Oct. 27, 2000

(86) PCT No.: PCT/JP00/07582

§ 371 (c)(1),
(2), (4) Date: Nov. 7, 2001

(87) PCT Pub. No.: WO01/31281

PCT Pub. Date: May 3, 2001

(30) Foreign Application Priority Data

| Oct. 28, 1999 | (JP) | ................................. 11/307156 |
| Dec. 17, 1999 | (JP) | ................................. 11/358807 |
| Jul. 12, 2000 | (JP) | ............................ 2000-211286 |

(51) Int. Cl.$^7$ .............................................. B05D 5/12
(52) U.S. Cl. ...................... 427/117; 29/592.1; 29/595; 29/883
(58) Field of Search ...................... 427/117; 29/592.1, 29/595, 825, 876, 883, 874

(56) References Cited

U.S. PATENT DOCUMENTS

| 5,131,679 A | * | 7/1992 | Novak et al. ............... 280/736 |
| 5,200,574 A | * | 4/1993 | Cunningham et al. ...... 102/530 |
| 5,269,560 A | * | 12/1993 | O'Loughlin et al. ........ 280/736 |
| 6,150,430 A | * | 11/2000 | Walters et al. ................ 522/79 |

FOREIGN PATENT DOCUMENTS

| JP | 3064725 U | 9/1990 | |
| JP | 06-341793 A | 12/1994 | |
| JP | 9-504599 A | 5/1997 | |
| JP | 9-506965 A | 7/1997 | |
| JP | 3055652 U | 12/1998 | |
| JP | 2001165600 A | * 6/2001 | ........... F24C 11/04 |

* cited by examiner

Primary Examiner—Faye M. Fleming
(74) Attorney, Agent, or Firm—Birch, Stewart, Kolasch & Birch, LLP.

(57) ABSTRACT

The present invention provides an electric type initiator which can secure a reliability in activation and can be easily manufactured. The electric type initiator is characterized by comprising a header portion formed by using a resin material, a pair of conductive pins having top portions going through the header portion and exposing from an end portion of the header portion, a bridge wire formed by using a conductive body bridging between the top portions of the conductive pins, and a priming arranged in contact with the bridge wire. And, the present invention provides an initiator assembly which can be easily manufactured with less steps of the manufacturing process and can further reduce a manufacturing cost. An initiator assembly including a priming for used in a motor vehicle comprising a priming, a conductive pin used for igniting the priming, and a collar member functioning as a fixing portion with respect to the inflator, wherein the conductive pin is arranged to go through the collar member, a molded member made of an insulating material is interposed between the collar member and the conductive pin, and the conductive pin, and the collar member and the molded member are integrally formed to constitute a base portion.

7 Claims, 14 Drawing Sheets

ELECTRIC TYPE INITIATOR AND GAS GENERATOR

This application is the national phase under 35 U.S.C. § 371 of PCT International Application No. PCT/JP00/07582 which has an International filing date of Oct. 27, 2000, which designated the United States of America.

TECHNICAL FIELD

The present invention relates to an electric type initiator which is activated by an electric signal at a time of collision, and more particularly to an electric type initiator used in a gas generator for an air bag and a seat belt pretensioner as a safety system of a motor vehicle, and an initiator assembly. That is, the present invention relates to an inflator for filling up an air bag for a vehicle or an inflatable article, and more particularly to an initiator (an electric trigger device) assembly for igniting and/or expanding a propellant (that is, a gas generating means) in an inflator.

The initiator for inflating the air bag of the motor vehicle or the other inflatable article includes the initiator assembly for igniting and/or expanding the propellant (a gas generating agent) stored in a housing of the inflator. The inflator activates the propellant (the gas generating agent) with an actuation of the initiator assembly to generate a gas for filling the inflatable article. The initiator assembly generally includes an outer shape or a member for being connected to a support structure (for example, a structure in an inner tube of the inflator).

PRIOR ART

The air bag apparatus and the seat belt pretensioner play an important part on the decrease in deaths and injuries caused by collisions. The initiator is activated by an electric signal outputted from a collision detecting system, and has a function of starting the operation of these safety devices.

Conventionally, it is known that the electric initiator includes a lot of constituting elements, and most of the electric initiators have a header and a cup portion which is combined with each other to form a cavity. The initiator further has at least one conductive pin which is a conductive path extending from the outside of the header and the cup to the cavity. An electric resistance member called a bridge wire is arranged inside the cavity, and a conductive pin is connected thereto. A compound having a very high thermal sensitivity, which is called as a primer is arranged in the vicinity of the bridge wire. Further, another compound called as an outputting charge (or a priming) is stored inside the cavity in the vicinity of the primer.

The initiator having the above structure starts operating when the electric signal is transmitted to the conductive pin. The bridge wire can convert an electric energy in the signal into a thermal energy, and the thermal energy increases a temperature of a resistance body, whereby an igniting reaction of the primer is started. The igniting reaction of the primer causes an igniting reaction of an outputting charge, and an increase of the pressure and the heat generated by these reactions break the cup to discharge a hot gas and particles outside.

In the gas generator for the air bag, the hot gas and the particles discharged from the initiator in this manner ignite a solid gas generating agent to generate a gas for inflating the air bag, and in the seat belt pretensioner, the hot gas and the particles move a piston so as to retract a seat belt. Accordingly, in order to securely operate the safety devices, it is important that the initiator is securely activated.

Accordingly, in the conventional art, there has been proposed various kinds of initiators for providing an electric initiator with a high reliability and a low cost. For example, in an electric initiator disclosed in JP-A No. 9-504599, for the purpose of solving the above problems, it is attempted to improve a reliability of the initiator by selecting the structure of the pin, the structure of mounting the pin to the header, the structure of mounting the header to the cup, the structure of mounting the resistance body to the pin, the structure of the resistance body, the outputting charge and the primer.

However, in the initiators which have been previously proposed, there is still room for improvement in a view of securing a sufficient reliability in operation and facility in manufacturing.

Further, in the header made of a resin, a nylon 6 is conventionally used as a resin material, however, in the header made of the nylon 6, the priming (explosive) is moisture-absorbed and deteriorated due to permeation of a moisture, and there may be a possibility such that the initial performance of the initiator cannot be obtained due to the use for many years under some environment.

Further, conventionally, there has been known an initiator having a structure in which a grand pin is connected to a metal end plate (eyelet) having a through hole, a center pin goes through the through hole of the metal end plate and an insulating material (such as a glass) is charged into a portion between the metal end plate and the center pin. Since this initiator is formed by combining a lot of parts, the steps in a manufacturing process are necessarily increased, and thereby a manufacturing cost is increased. Further, since many steps in a manufacturing processes are required, a possibility such that defective goods may be produced also becomes high.

Under the condition described above, it is desired to make it easier to connect the initiator assembly to the inflator housing as well as to reduce a size of an injection-molded portion of a plastic material. Additionally, it is impermissible that the initiator aspect gives a load to manufacturing the initiator assembly and increases a manufacturing cost of the initiator assembly.

Conventionally, there has been known an initiator having an outer metal casing including a boss or a collar for connecting to the inflator housing. The collar is positioned on an outer surface of the insulating material surrounding the conductive pin of the initiator. Further, in a design of the other known initiator assemblies, there has been known a cover having a injection-molded portion of a plastic material surrounding the initiator.

DISCLOSURE OF THE INVENTION

The present invention is made so as to solve the problems described above, and an object of the present invention is to provide an electric type initiator which can secure a reliability at a time of operation and can be easily manufactured.

Further, another object of the present invention is to provide an initiator assembly which can be easily manufactured with less steps in a manufacturing process and can reduce a manufacturing cost.

According to the present invention, there can be provided an electric type initiator comprising a header portion formed from an insulating material, a pair of conductive pins going through the header portion and having the top portions thereof exposed on an end portion of the header portion, a bridge wire formed by using a conductive body spanned between the top portions of the conductive pins, and a priming arranged in contact with the bridge wire.

Further, according to the present invention, there is provided an electric type initiator further comprising a priming, a conductive pin used for igniting the priming, and a collar member functioning as a fixing portion of the inflator, wherein the conductive pin is arranged to go through the collar member, a molded member made of an insulating material is interposed between the collar member and the conductive pin, and the conductive pin, the collar member and the molded member are integrally formed to constitute a base portion.

The electric type initiator according to the present invention may further include a bridge wire used for igniting the priming and a conductive pin connected to the bridge wire.

The present invention relates to an initiator assembly including the electric type initiator of any one of the aspects described above and the collar member for fixing the electric type initiator.

The present invention provides a gas generator for a pretensioner or a gas generator for an air bag which uses the electric type initiator of any one of the aspects described above or the initiator assembly described above. Further, the present invention provides an air bag apparatus or a pretensioner apparatus which includes the above elements, and a seat belt apparatus including the pretensioner apparatus.

The present invention further provides a method of manufacturing an electric type initiator.

The present invention provides an application of a resin having a specific physical properties for a material to form the header portion of the electric type initiator. The resin has an insulating function. Desirably, the resin material is melted to form the header portion without generating bubbles on the surface in contact with the conductive pin 2. For example, a molding condition such as an applied pressure is adjusted.

That is, the present invention provides a method of forming the header portion by a resin having any one of the following physical properties (a), (b), (c) and (d) and insulating the conductive pin and the collar, in the electric type initiator. And, the present invention provides a utilization of the resin for insulating between the conductive pin and the collar, or an insulating body.

(a) In the resin material, a coefficient of water absorption after being submerged for 24 hours at 23° C. is 0.005 to 3.0% and a tensile strength is 100 to 250 MPa.

(b) In the resin material, a tensile strength is not less than 100 MPa and a dielectric breakdown voltage is not less than 10 MV/m.

(c) In the insulating material, a coefficient of linear expansion is not more than $8 \times 10^{-5}$/° C., the tensile strength is not less than 100 MPa and a dielectric breakdown voltage is not less than 10 MV/m.

(d) In the resin material, a coefficient of water absorption after being submerged for 24 hours at 23° C. is 0.005 to 1.0% and a tensile strength is 100 to 250 MPa.

DETAILED DESCRIPTION OF THE INVENTION

An electric type initiator according to the present invention comprises a header portion formed from an insulating material, a pair of conductive pins going through the header portion and having top portions thereof exposed on an end portion of the header portion, a bridge wire formed by using a conductive body spanned between the top portions of the conductive pins, and a priming arranged in contact with the bridge wire.

Further, in the electric type initiator according to the present invention, an amount of change in a conductive resistance between the conductive pins after standing for 1000 hours in a state of flowing an electric current of 50 mA to the bridge wire at the temperature of 80° C. under the humidity of 95% is within ±0.2 Ω before standing, preferably within ±0.1 Ω, more preferably within 0.05 Ω. Further, an ignition starting time of the priming in this case is set to be not more than 2 msec after applying an ignition electric current for starting an activation of the electric type initiator. The ignition electric current is selected among 0.8A, 1.2 A or the range between 0.8 and 1.2 A.

In the present invention, the resin material is preferably used as an insulating material to form the header portion, however, a glass material or a ceramic material can be used.

In the header portion formed from, for example, a resin material as the insulating material, it is desirable that bubbles formed in the header portion may provide the maximum distance of 0.10 mm or less between the conductive pin and the insulating material in the radial direction. That is, the bubbles, formed on the contacting surface of the conductive pin, may preferably have a largeness of 0.10 mm or less, more preferably 0.05 mm or less, from the conductive pin in the radial direction of the header portion. Further, in the header portion formed from the insulating material, desirably, the bubbles generated on the contacting surface between the header portion and the respective conductive pins do not go through along the axial direction of the header portion.

Further, in the electric type initiator according to the present invention, a moisture-proofing means can be provided between the conductive pin and the header portion. The moisture proofing means described above can be realized by concave and convex surfaces or the like formed in the peripheral direction on part within the header portion of the conductive pin.

The header portion closing an end surface of a cavity storing the priming holds a conductive pin for transmitting an electric energy to the bridge wire.

The initiator described above can be formed, for example, by making two conductive pins go through the header portion and having the end portions thereof exposed on the end surface of the header portion. And the end portions of the conductive pins are connected to each other by the bridge wire so as to be conductive, and the priming is press-loaded to be in contact with the bridge wire. In the case that the cap member formed in a cylindrical body with a top forming a cavity for storing the priming comprises a cylindrical charge holder and a circular cover member closing a front end of the charge holder, the press-loading of the priming can be performed by mounting the charge holder to the header portion, press-loading the priming in the inner space thereof (inside the cavity), connecting the cover member to an open end of the charge holder, and closing the cavity in which the priming is stored. Due to the conductive pin receiving an electric signal, the bridge wire generates a heat to ignite and burn the priming, and the flame thereof breaks the container forming the cavity storing the priming and is discharged to the periphery.

In the electric type initiator described above, not only a thermoplastic resin but also a thermosetting resin can be employed as the resin material to form the header portion closing the end surface of the cavity storing the priming as well as holding the conductive pin. In this case, it is desirable to use the resin material in which a coefficient of water absorption after being submerged for 24 hours at 23° C. is between 0.005 and 1.0% and a tensile strength is between 100 and 250 MPa. The coefficient of water absorption (after being submerged for 24 hours at 23° C.) of the resin material to form the header portion is more preferably between 0.01 and 0.5%, and further preferably between 0.01 and 0.1%. Further, with respect to the tensile strength of the resin material, it is more preferably between 160 and 250 MPa and further preferably between 170 and 230 MPa.

Further, as for the insulating material forming the header portion, the material in which a coefficient of linear expansion is not more than $8 \times 10^{-5}$/° C., the tensile strength is not less than 100 MPa and a dielectric breakdown voltage is not less than 10 MV/m is preferably used. The tensile strength of the insulating material described above is particularly desired to be not less than 170 MPa and preferable to be not more than 250 MPa. Accordingly, the tensile strength is preferable to be not less than 100 MPa but not more than 250 MPa, and particularly preferable to be not less than 170 MPa but not more than 250 MPa. Further, in the case of using the resin material as the insulating material, there is preferably used the material in which the coefficient of water absorption after being submerged for 24 hours at 23° C. is between 0.005 and 3.0%.

As the resin material described above, the thermoplastic resin or the thermosetting resin is preferable, and the resin further containing a glass fiber or another inorganic charging material is preferable.

As the thermoplastic material, it is possible to use a polybutylene terephthalate (PBT), a polyphenylene sulfide (PPS) or a liquid crystal polymer (LCP) containing an inorganic charging material such as a mineral. At a time of using the above resin, it is preferable to contain 20 to 80 weight % of a glass fiber in the polybutylene terephthalate (PBT), contain 20 to 80 weight % of a glass fiber in the polyphenylene sulfide (PPS), and contain 20 to 80 weight % of a mineral in the liquid crystal polymer (LCP). In particular, in the case of using a glass reinforced resin containing the glass fiber, an orientation of the glass fiber is desirably adjusted so as to be along the extending direction of the conductive pin inserted to the header portion. Further, a percentage content of the inorganic charging material in each of the resin material is more preferably between 30 and 50 weight %.

As the thermosetting resin, an unsaturated polyester is preferable.

The electric type initiator formed by using the resin material as the insulating material can be easily manufactured and also restrict the manufacturing cost in comparison with the case of being formed with using the metal. Further, in the case of forming the header portion with using the resin material described above, and thereby it is possible to avoid, as perfectly as possible, such a circumstance that the moisture enters the header portion and reaches the priming and the priming absorbs the moisture to be deteriorated. That is, if the header portion described above is used, the initial initiator performance can be obtained even after being disposed for a long period of time under the environment in the motor vehicle or the like. In particular, in the case of using the polyphenylene sulfide (PPS) containing the charging material or the liquid crystal polymer (LCP), an injection molding can be performed and a high productivity and a low cost can be achieved, which is desirable.

The above electric type initiator can constitute a gas generator for a pretensioner together with a collar member fixing the electric type initiator, a cup member fixing a lower opening portion to the collar member so as to partly surround the initiator, and a gas generating agent charged in a space portion between the cup member and the electric type initiator and ignited and burnt in accordance with an activation of the initiator.

According to the present invention, there can be provided an initiator assembly having an improved inflator. Particularly in this initiator assembly, a base portion is formed by the collar member, the conductive pin and the molded member made of the insulating material, and the assembly is characterized in being formed with using the same.

That is, according to the present invention, there is provided an initiator assembly including a priming for being used in a motor vehicle, comprising a priming, a bridge wire used for igniting the priming, a conductive pin connected to the bridge wire, and a collar member functioning as a fixing portion with respect to the inflator, wherein the conductive pin is arranged to go through the collar member, a molded member made of an insulating material is interposed between the collar member and the conductive pin, and the conductive pin, the collar member and the molded member are integrally formed so as to constitute a base portion.

In the present invention, a entire structure of the initiator assembly becomes simple by using the part (the base portion) obtained by integrally forming the conductive pin, the molded member and the collar member as described above, so that a manufacturing cost can be reduced.

The base portion described above can be produced, for example, by integrally forming a cylindrical collar member having an inwardly shaped portion like a flange, two conductive pins going through between the flange-like portions of the collar member, and the molded member interposed between the collar member and two conductive pins. That is, the base portion is an integrally formed component which is arranged with two conductive pins going through substantially in the center of the molded member made of the insulating material, and in that the molded member is partly surrounded by the collar member. The integral forming of the base portion can be performed, for example, by charging the insulating material constituting the molded member between the cylindrical collar member having the inwardly shaped portion like a flange and two conductive pins going through between the flange-like portions of the collar member. The insulating material is charged between the collar member and the conductive pin and hardened, whereby the collar member and the conductive pin are fixed, and both members are insulated by the molded member composed of the charged insulating material. As the insulating material described above, for example, the glass material, the ceramic material, the resin material or the like can be used, and there is desirably used the material in which a coefficient of linear expansion is not more than $8 \times 10^{-5}$, a tensile strength is not less than 100 MPa and a dielectric breakdown voltage is not less than 10 MV/m. The tensile strength of the insulating material described above is particularly desirable to be not less than 170 MPa, but is preferable to be not more than 250 MPa. Accordingly, the tensile strength is preferable to be not less than 100 MPa but not more than 250 MPa, and particularly preferable to be not less than 170 MPa but not more than 250 MPa.

In the case of using the resin material as the insulating material, the resin material is preferably structured such that the coefficient of water absorption after being submerged for 24 hours at 23° C. is between 0.005 and 3.0%. As the resin material described above, it is possible to use a polyester resin such as a polyethylene terephthalate (PET), a polybutylene terephthalate (PBT) or the like, a nylon resin such as a nylon 6, a nylon 6/6, a nylon 6/10, a nylon 12 or the like, a polyphenylene sulfide (PPS) and a liquid crystal polymer (LCP). Preferably, the glass fiber and another inorganic filling materials are mixed to the resin, and the inorganic filling material can be contained at the rate between 20 and 80 weight %. Further, the resin material described above can employ the material in which the coefficient of water absorption after being submerged for 24 hours at 23° C. is between 0.005 and 1.0%, and preferably, the polyphenylene sulfide (PPS) containing a glass fiber or another inorganic filling materials or the liquid crystal polymer (LCP) containing the inorganic filling material such as a mineral can be used as the above resin material. At a time of using the above resin material, it is preferable that the polyphenylene sulfide (PPS) contains 20 to 80 weight % of a glass fiber, and the liquid crystal polymer (LCP) contains 20 to 80 weight % of a mineral. In particular, in the case of using a glass reinforced resin containing a glass fiber, the orientation of the glass fiber is desirably adjusted so as to be along the extending direction of the conductive pin arranged to go through between the flange-like portions of the collar member. Further, the percentage content of the inorganic filling material in each of the resin materials is more preferably between 30 and 50 weight %.

The initiator assembly formed by using the resin material described above as the insulating material can be easily manufactured and can restrict a manufacturing cost. Further, if the base portion is formed by using the resin material described above, the moisture permeates through the molded member in the base portion, whereby it is possible to avoid, as perfectly as possible, the circumstance such that the priming absorbs the moisture to be deteriorated. That is, if the base portion described above is used, even in the case of being disposed for a long period of time under the environment in a motor vehicle, it is possible to obtain the initial initiator performance. In particular, in the case of using the polyphenylene sulfide (PPS) containing the filling material or the liquid crystal polymer (LCP) as the insulating material, an injection-molding can be performed and a high productivity and low cost can be achieved, which is desirable.

In the base portion described above, the molded member made of the insulating material is held between the flange-like portions of the collar member. Further, it is demanded that a connection between the molded member and the collar member is securely maintained. Therefore, in the present invention, a falling-out preventing means of the molded member, which is in such a form that both elements are complementarily engaged with each other, is desirably formed in a joint portion between the molded member and the collar member. The falling-out preventing means described above can be realized, for example, by forming a convex portion or a concave portion on an inner circumferential surface of the flange-like portion in the collar member and forming a convex portion or a concave portion in the molded member in such a manner as to be complementarily engaged with the former convex portion of the concave portion. In the present invention, in the case of charging the insulating member inside the flange portion of the collar member so as to form the molded member, for example, by forming the convex portion on the inner circumferential surface of the flange-like portion in the collar member, the concave portion in the molded member side can be molded by the convex portion described above. In the case of injection-molding the insulating material, a combination of the convex portion and the concave portion in the inner circumferential surface of the flange-like portion of the collar member and the molded member is particularly desirably constituted by forming the convex portion on the inner circumferential surface side of the flange-like portion in the collar member and, in the molded member side, forming the concave portion complementarily fitted to the above convex portion. In accordance with the combination described above, it is possible to securely charge the insulating material all around the inner circumferential surface of the flange-like portion without making a hollow.

Meantime, in the present invention, the base portion is integrally formed to include the conductive pin as described above. Further, the conductive pin is arranged so as to go through between the flange-like portions of the collar member, and is fixed and insulated by the charged insulating material (that is, the molded member). Accordingly, it is desirable that the conductive pin is also securely fixed to the molded member, and more preferably, it is desirable to prevent the humidity or the moisture from passing through a gap between the conductive pin and the molded member. Therefore, in the present invention, the concave and convex surfaces extending in the peripheral direction are formed on part within the molded member of the conductive pin, and the insulating material is charged between the conductive pin and the collar member, whereby making an inosculation of the conductive pin and the molded member secure.

The base portion can be integrally formed so that a top portion of the conductive pin is exposed on an upper surface of the molded member. A bridge wire capable of converting an electric energy into a thermal energy is connected to the top portion of the conductive pin. In the case that the base portion includes at least two conductive pins, the bridge wire is arranged to bridge between the top portions of the respective conductive pins, and in the case that the base portion includes one conductive pin, the bridge wire is provided to bridge between the top portion of the conductive pin and another conductive body having a different electrical potential from that of the conductive pin.

As the bridge wire, aside from the conventional method such as to directly use a narrow wire having an electric resistance, in the present invention, a circuit bridging between the top portions may be formed in accordance with an etching or the like after plating between the top portions of the conductive pins with the conductive material, or alternatively, a circuit bridging between the top portions may be formed by adhering a member with a circuit formed on an insulative substrate by means of a welding or the like.

The priming to be ignited and burnt by the bridge wire is arranged in a side in the base portion where the top portion of the conductive pin is exposed, and a space storing the priming is sealed off from the ambient air because of a cover member in a cylindrical shape with a top in the outside thereof. Accordingly, in order to securely ignite the priming by the bridge wire, it is desirable that both members are arranged close to each other (more desirably, in contact with each other). In view of the above, the priming can be arranged as follows in the present invention.

(1) The tube portion protruding from the flange-like portion of the collar member outwardly in the axial direction is formed in the molded member, the circumferential wall of the tube portion is step-notched so as to form a stepped notch portion, and the cylindrical charge holder is fitted to the outside of the stepped notch portion, whereby the cavity is defined by the end surface of the tube portion in the molded member and the charge holder, and the priming is press-loaded inside the cavity.

(2) In the base portion, the end surface in the side where the top portion of the conductive pin is exposed is projected cylindrically and outwardly in the axial direction to form the press-loading portion and the press-loading portion is fitted into the cover member storing the priming, whereby the priming in the cover member is press-loaded. In this case, the charge holder can be omitted and the manufacturing cost can be further reduced.

Since the priming and the bridge wire are brought into contact with each other by arranging the priming in the above manner, the secure ignition of the priming can be expected. Further, with respect to an initiator for 0.8 ampere ignition (that is, an initiator to be activated by an igniting electric current of 0.8 ampere), a primer such as a lead styphnate conventionally arranged near the bridge wire for burning the priming is not required and lead source can be removed out in the situation where the initiator is used. As a result, if the above features are provided, the initiator assembly which is easily manufactured and reliable in activation can be realized, without generating any lead due to the activation. As the priming described above, it is possible to use a zirconium potassium perchlorate system. The bridge wire is, for example, made of a resistance wire, and a means for triggering the priming is suitably employed as well.

Further, in the cover member described above, the opening end thereof is required to be closed in order to prevent the priming from being moisture absorbed. Since the initiator assembly according to the present invention is formed by using the base portion obtained by integrally forming the collar member, the molded member and the conductive pin, the cover member and the base portion can be connected as follows.

(1) The opening end portion of the cover member storing the priming inside is bent into a flange shape, and the flange portion of the cover member is joined and integrally formed with the flange-like portion of the collar member.

(2) An annular portion bent outside in the axial direction from the front end of the flange-like portion is formed in the collar member, the annular portion is fitted and inserted to the cover member and the circumferential wall in the opening of the cover member and the annular portion of the collar member are joined to be integrally formed with each other.

The initiator assembly described above can be manufactured, for example, in the following method.

That is, two conductive pins goes through the cylindrical collar member having an inwardly shaped portion like a flange, and the insulating material is charged between the collar member and the conductive pin so as to form the base portion. At a time of forming the base portion, the molded member made of the insulating material protrudes outside in the axial direction of the collar member so as to form a stepped notch shape, and the insulating material is charged so that the top portion of the conductive pin is exposed on the end surface thereof. Further, the bridge wire is connected to the top portion of the conductive pin, and the cylindrical charge holder is welded to the stepped notch portion (that is, the base portion) of the molded member. The charge holder and the stepped notch portion (that is, the base portion) are desirably welded by such a welding method that the molten resin is not made contact with the conductive pin, for example, an ultrasonic welding. This is because there is a risk that the bridge wire is broken if the molten resin is in contact with the conductive pin. The bottom surface of the charge holder is closed by welding the cylindrical charge holder to the stepped notch portion (that is, the base portion) of the molded member, whereby a substantially cylindrical cavity is formed. The priming is press-loaded in the cavity, and the cavity is closed by covering the cover member formed in the cylindrical shape with the top thereon. The cover member is welded to the collar member constituting the base portion to be integrally formed. In view of safety at manufacturing, the cover member and the base portion (particularly, the collar member) are desirably welded in accordance with a welding method with a less heat input, for example, a resistance welding or a laser welding. The welding of both members can be performed by welding the flange portion of the cover member to the flange-like member of the collar member in the case of forming the opening end portion of the cover member into a flange shape, and in the case of forming the annular portion bent outside in the axial direction in the front end of the flange-like portion in the collar member, the annular portion can be welded to the opening side of the circumferential wall in the cover member.

Further, in this manufacturing method, with respect to the press-loading of the priming, the press-loading portion projecting cylindrically and outwardly in the axial direction is formed on the upper surface of the base portion, that is, the end surface in the side where the top portion of the conductive pin is exposed, and fitted and inserted into the cover member storing the priming, whereby press-loading the priming.

In this manufacturing method, at a time of connecting the bridge wire between the top portions of the conductive pins exposing on the end surface of the molded member, the end surface of the molded member and the top portion of the conductive pin are desirably formed in a flat surface. This is because the bridge wire can be arranged on the top portions, in contact therewith, by straining the bridge wire and welding the wire to the top portions of the conductive pins.

The present invention having the above features can be composed of inexpensive parts and the number of the manufacturing steps can be reduced, and then, the yield can be improved, and thereby a production cost can be reduced largely. Further, since no conductive pin is brought into contact with the collar member or the cover member, it is possible to omit a tefsel cover used for insulating the conductive pin (the initiator pin) from the cover member. That is, in the present invention, an integral formation among the collar member, the molded member and the conductive pin promotes an assembling process of the initiator assembly.

The initiator assembly structured in the above manner can be accommodated in the housing having a gas discharge port, including therein a gas generating means to be burnt and/or be expanded upon activation thereof for generating a working gas, thereby constituting a gas generator for an air bag. Further, the gas generator for the air bag is accommocated in the module case together with an air bag (a bag body) introducing the gas generated in the gas generator so as to inflate, thereby constituting an air bag apparatus. In the air bag apparatus, the gas generator is activated reacting with the impact detected by an impact sensor and a combustion gas is discharged from the gas discharge port of the housing. The combustion gas flows into the air bag, whereby the air bag breaks the module cover to inflate, forming a cushion absorbing an impact between a hard structure in the motor vehicle and the passenger.

According to the electric type initiator of the present invention, since the insulating material, particularly the resin material is used as the forming material of the header portion, an amount of the bubbles existing in the molded header portion can be reduced, specifically, the bubble, formed on the contacting surface of the conductive pin, provides the maximum distance of 0.10 mm or less between the conductive pin and the resin in the radial direction, and thereby it is prevented that the moisture enters into the header portion through the bubbles to reach the priming and the priming absorbs the moisture to be deteriorated. Consequently, a changing amount of a conductive resistance between a pair of conductive pins after standing under the predetermined condition described above can be maintained within ±0.2 Ω of that before being standing, and further, an ignition starting time of the priming after standing under the same condition can be maintained not more than 2 msec after applying the igniting electric current for starting the activation of the electric type initiator. The present invention can obtain the following effects in addition to the effects described above.

According to the present invention, there can be realized the initiator assembly in which the number of the manufacturing steps can be reduced, the manufacturing can be performed easily, and a production cost can be further reduced. Further, since the number of the parts and the number of the manufacturing steps are reduced, a yield can be improved.

Additionally, since no conductive pin contacts with the collar member constituting the base portion, a tefsel cover conventionally used for insulating both members can be omitted.

According to the present invention, there can be realized the initiator assembly which can secure a reliability in activation and can be easily manufactured. In particular, in the electric type initiator of the present invention, since the inside of the cavity storing the priming is closed by the cover member, the priming to be ignited and burnt by a thermal energy of the bridge wire can be press-loaded into the cavity on the side to be covered by the cover member. Further, the bridge wire is provided in the side inside the cavity where the priming is press-loaded, and thereby the priming and the bridge wire can be securely brought into contact with each other, and the contact state can be maintained. Finally, the manufacturing easiness can be improved by forming in the above-described manner.

Further, in the case of making the header portion holding the conductive pin of the resin material in which the coefficient of water absorption after being submerged for 24 hours at 23° C. is between 0.005 and 3.0% and the tensile strength is between 100 and 250 MPa, there can be provided the electric type initiator which can be easily manufactured, reduce the manufacturing cost, maintain the initial performance even after being used in for a long period of time under the environment in the motor vehicle, and hardly expands and compresses.

Figure 1:
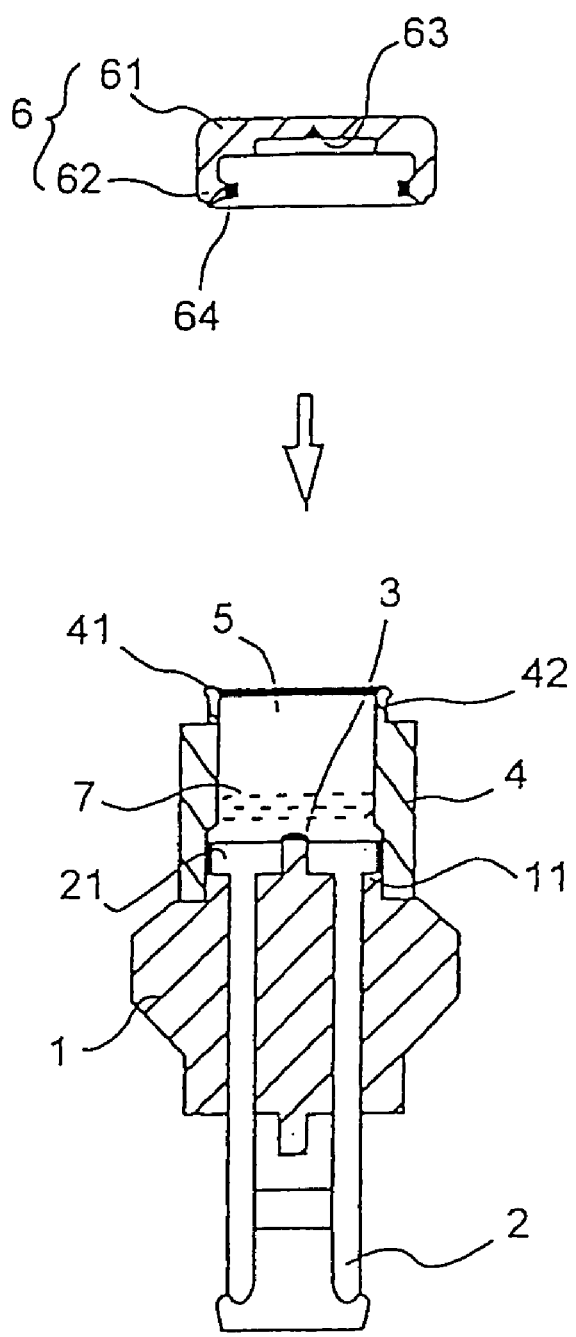
FIG. 1 is a vertical cross sectional view showing one embodiment of an electric type initiator according to the present invention.

In the drawings, the reference numerals 13, 301, 321, 331, 113, 401, 421 and 431 denote a collar member; the reference numerals 2, 302 and 402 denote a conductive pin; the reference numerals 1, 303, 323, 333, 403, 423 and 433 denote a molded member; the reference numerals 304, 324, 334, 404, 424 and 434 denote a base portion; the reference numerals 305, 325, 335, 405, 425 and 435 denote a cover member; the reference numerals 7, 306 and 406 denote a priming; the reference numerals 3, 307 and 407 denote a bridge wire; the reference numerals 4, 310 and 410 denote a charge holder; the reference numerals 311 and 411 denote a tube portion; the reference numerals 350, 360, 450 and 460 denote an annular portion; the reference numerals 370 and 470 denote a press-loading portion; the reference numeral 100 denotes an initiator assembly; the reference numeral 103 denotes a housing; the reference numerals 22 and 105 denote a gas generating means; the reference numeral 106 denotes a filter means; the reference numeral 108 denotes an inner cylindrical member; the reference numeral 201 denotes an impact sensor; the reference numeral 202 denotes a control unit; the reference numeral 203 denotes a module case; and the reference numeral 204 denotes an air bag.

PREFERRED EMBODIMENTS OF THE INVENTION

The present invention will be described in detail as follows with reference to the drawings showing one embodiment of the present invention.

Embodiment 1

FIG. 1 is an exploded view showing one embodiment of an electric type initiator according to the present invention. In the electric type initiator shown in this drawing, a glass fiber reinforced resin is injection-molded around two conductive pins 2 so as to form a header portion 1, and two conductive pins 2 respectively expose their flange-like top portions 21 at an end portion of the header portion. Further, the top portions 21 of the conductive pins are connected to each other by a bridge wire 3 so as to be able to electrified. It is desirable to connect these members with a resistance-welding. The connection can be performed with a soldering, however, in this case, a further material (such as a solder, a flux) is required, which makes manufacturing difficult and costly. In the top portions 21 of the conductive pins 2 in a flange shape, an interval therebetween is adjusted. Further, the conductive pin 2 is inserted into the header portion 1, and, in the present embodiment, a knurl (concave and convex surfaces, a rib or a boss formed in the circumferential direction) as a moisture-proofing means is formed on an outer periphery of each of the conductive pins in order to block an entering of the ambient air or a leakage of the gas between the header portion and the conductive pin.

The header portion 1 is made of a resin material in which a coefficient of water absorption after being submerged for 24 hours at 23° C. is between 0.005 and 1.0% and a tensile strength is between 100 and 250. As a resin material, a polybutylene terephthalate (a coefficient of water absorption after being submerged for 24 hours at 23° C. is 0.07% and a tensile strength is 132 MPa) containing 20 weight % of a glass fiber, a polybutylene terephthalate (a coefficient of water absorption after being submerged for 24 hours at 23° C. is 0.07% and a tensile strength is 156 MPa) containing 45 weight % of a glass fiber, a polyphenylene sulfide (a coefficient of water absorption after being submerged for 24 hours at 23° C. is 0.015% and a tensile strength is 196 MPa) containing 40 weight % of a glass fiber, and a liquid crystal polymer (a coefficient of water absorption after being submerged for 24 hours at 23° C. is 0.04% and a tensile strength is 171 MPa) containing 50 weight % of a mineral can be used. The header portion 1 can be formed by melting such a resin material and funneling the resin around a pair of conductive pins. When the header portion 1 of the molten resin material is molded, it is desirable that no bubbles are generated on a surface contacting the conductive pins 2 in the header portion 1. The molding method described above can be performed, for example, by adjusting a molding condition such as a dwelling, in particular, by setting a dwelling at a time of molding to be not less than 110 MPa.

Particularly, it is desirable to adjust the molding condition of the header portion 1 as described above so that the bubbles, formed on the contacting surface of the conductive pin in the header portion 1, provides the maximum distance of 0.10 mm or less, preferably 0.05 or less between the conductive pin and the resin in the radial direction.

Further, the header portion 1 is formed so that an end surface in a side where the top portion 21 of the conductive pin 2 is exposed protrudes cylindrically. The protruding portion (hereinafter, referred to as a cylindrical end portion 11) of the header portion 1 is inwardly fitted to a charge holder 4 formed in a substantially cylindrical shape, so as to form a joint portion between the header portion 1 and the charge holder 4. The header portion and the charge holder can be joined by an ultrasonic welding.

The cavity 5 comprises an end surface of the cylindrical end portion 11 of the header portion and the charger holder 4, and a priming 7 to be ignited and burnt by a heat generation of the bridge wire 3 caused by an electric energy is press-loaded into the cavity 5. As the priming described above, a mixture (ZPP) of zirconium/potassium perchlorate is preferably used.

In accordance with this embodiment, an opening end 41 of the charge holder 4, that is, the opposite end portion to the side where the circular end portion 11 of the header portion is inwardly fitted is formed to have a stepped notch in the outer periphery. A cover member 6 formed separately from the charge holder 4 composing a circumferential wall portion of the cavity 5 is fitted over the outside of the stepped notch portion 42, and the charge holder 4 and the cover member 6 are joined by an ultrasonic welding. Accordingly, the cavity 5 in which the priming 7 is stored is sealed, and is shut from the external environment. The cover member 6 comprises a circular portion 61 closing the cavity 5 and a circumferential wall portion 62 jointed to the stepped notch portion 42, a vulnerable portion 63 is obtained by making a part of the circular portion 61 thin or forming a groove on the circular portion, and a projection 64 jointed to the stepped notch portion 42 in the charge holder 4 is provided in the circumferential wall portion 62. The vulnerable portion 63 is broken prior to the other wall portions when the priming 7 is burnt, thereby restricting an injecting direction of the flame and the gas. Since a thermal energy of the flame or the like can be concentrically discharged by restricting the injecting direction of the flame or the like as described above, it is possible to securely ignite the gas generating agent. Further, since the projection 64 is jointed to the stepped notch portion 42, the welding can be performed easily and securely.

The bridge wire 3 generates heat with an electric energy (that is, an activating signal) inputted through the conductive pin, and has an electric resistance. The bridge wire 3 can be formed by using one or a plurality of metals (wires). The bridge wire 3 can be formed by using so called a nichrome comprising nickel-chrome-iron alloy, or by using another metals such as a stainless steel or a platinum. In particular, the nichrome is preferable since it has a large temperature coefficient of resistance (TCR) and is excellent in welding.

At a time of activating the electric type initiator, when an activating signal is received from a connector (not shown) connected to the conductive pin 2, the activating signal is transmitted to the bridge wire 3 via the conductive pin 2. The bridge wire 3 heated by the electric energy (that is, the activating signal) ignites and burns the priming 5 to discharge the flame, the gas and the like. At this time, since the vulnerable portion 63 is formed in the cover member 6, this portion is broken primally so as to restrict an injecting direction of the flame, the gas and the like.

Further, as described above, in the electric type initiator in which the priming in the cavity is prevented from absorbing the moisture, it is possible that a changing amount of a conductive resistance between a pair of the above conductive pins after standing for 1000 hours in a state of flowing electric current of 50 mA to the bridge wire, under an environment of temperature 80° C. and humidity 95% is set within ±0.2 Ω with respect to a value before standing, preferably within ±0.1 Ω, and more preferably within ±0.05 Ω, and further, it is possible that an ignition starting time of the priming is set to not more than 2 msec after applying an igniting electric current.

Figure 2:
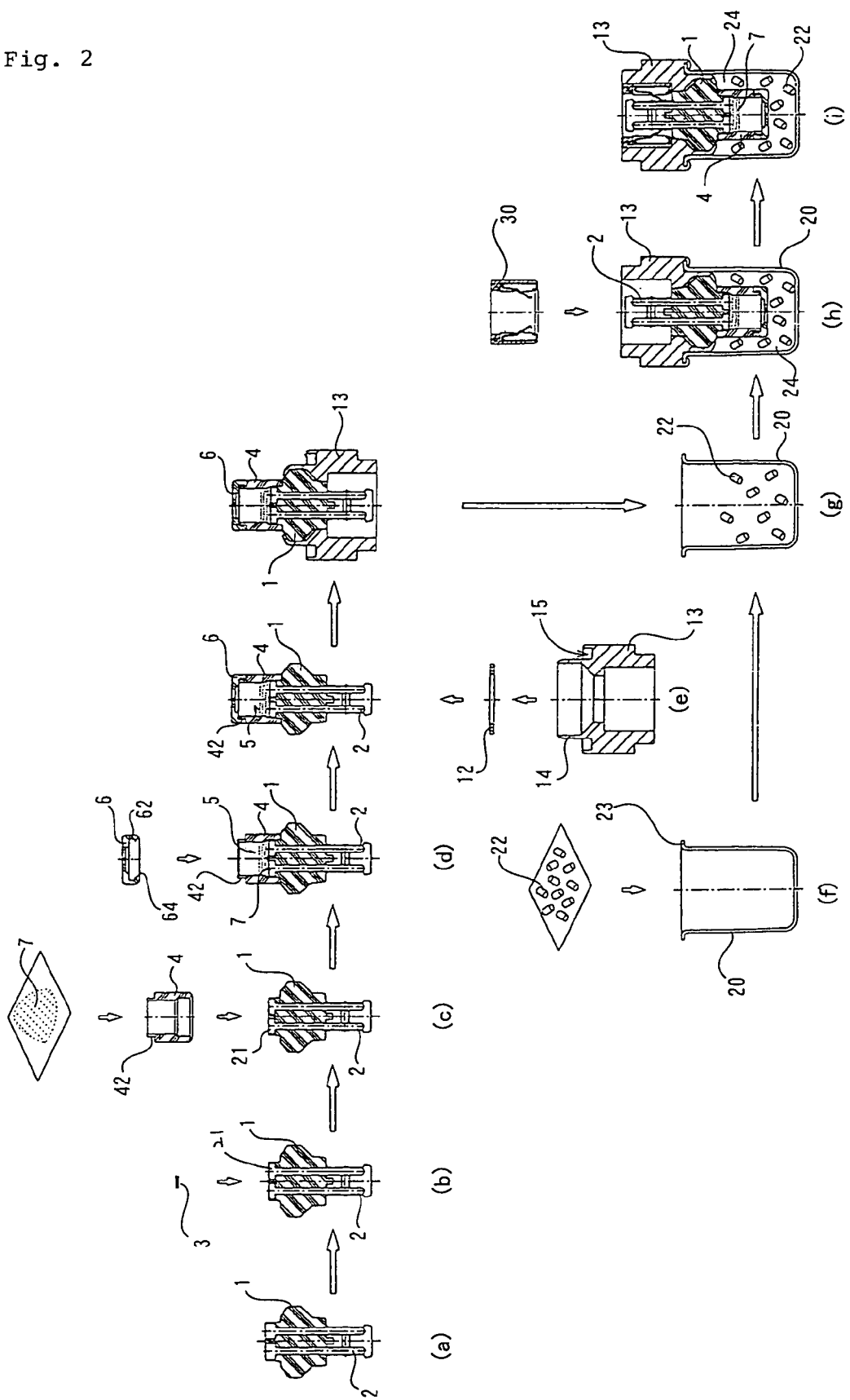
FIG. 2 is a schematic view showing one manufacturing process of the electric type initiator shown in FIG. 1.

The above electric type initiator in which the cavity 5 storing the priming 7 is closed by the cover member 6 can be manufactured, for example, in accordance with a process shown in (a) to (e) of FIG. 2.

At first, the resin material in which a coefficient of water absorption after being submerged for 24 hours at 23° C. is between 0.005 and 1.0% and a tensile strength is between 100 and 250 is molten and poured around two conductive pins 2 so as to form the header portion 1, thereby forming a header assembly, and this header assembly is polished ((a) in FIG. 2). In the process of making the header portion of the resin material, for example, by adjusting a molding condition (in this embodiment, setting a dwelling to not less than 110 MPa), generation of bubbles between the molded header portion and the respective conductive pins can be inhibited, whereby entering of the moisture between both members can be inhibited. Further, entering of the moisture between the header portion and the respective conductive pins can be also inhibited by forming a knurl in the conductive pins.

Next, the bridge wire 3 bridges between the top portions 21 formed in a flange-like shape of the conductive pins 2 ((b) in FIG. 2), and is joined by a resistance welding, whereby a bridge-wire (B/W) welded sub-assembly is formed ((b)→(c) in FIG. 2). And the cylindrical charge holder 4 is arranged over the top portions 21 of the conductive pin 2 in the bridge-wire (B/W) welded sub-assembly and joined by an ultrasonic welding, and the priming 7 is press-loaded inside the charger holder 4, whereby forming a charge-holder (C/H) welded sub-assembly ((c)→(d) in FIG. 2). Next, the opening end (that is, the stepped notch portion 42) of the charge holder 4 in the charge holder (C/H) welded sub-assembly is joined and closed by the cover member 6 with an ultrasonic welding, whereby forming the initiator ((d)→(e) in FIG. 2). In an aspect shown in this drawing, the projection 64 is provided in the circumferential wall portion 62 of the cover member 6, and this is jointed to the stepped notch portion 42 of the charge holder 4, so that both members can be fitted and jointed before being welded.

Consequently, in the initiator formed in the above manner, a collar 13 is arranged in the opposite side of the charge holder 4 in the initiator via a gasket 12, and the initiator is press-inserted and an end portion 14 in an initiator receiving port of the collar 13 is crimped so as to be integrally formed, whereby forming an initiator assembly ((e)→(g) in FIG. 2). It is desirable that the end portion 14 of the initiator receiving port is formed so that a hook (that is, a crimped portion) is made short so as to prevent an electric discharge with respect to the pin at a time of applying a static electricity. If a distance between the hook and the pin is short at a time of applying a static electricity, there is a risk that an electric discharge is generated therebetween so as to ignite a priming. Then, it is possible to prevent an electric discharge in this portion by increasing the distance between the hook and the pin. Reference numeral 15 in (e) of FIG. 2 denotes a circular groove.

The initiator assembly formed in the above manner can be used as a constituting part for manufacturing a gas generator used in a pretensioner for a seat belt. The gas generator for the pretensioner using the initiator assembly can be manufactured in accordance with a process shown in (f) to (i) of FIG. 2. In (f) to (i) of FIG. 2, the reference numeral 15 denotes a circular groove, the reference numeral 20 denotes a cup member, the reference numeral 22 denotes a gas generating agent, the reference numeral 23 denotes a flange portion, the reference numeral 24 denotes a combustion chamber, and the reference numeral 30 denotes a retainer.

Embodiment 2

Figure 3:
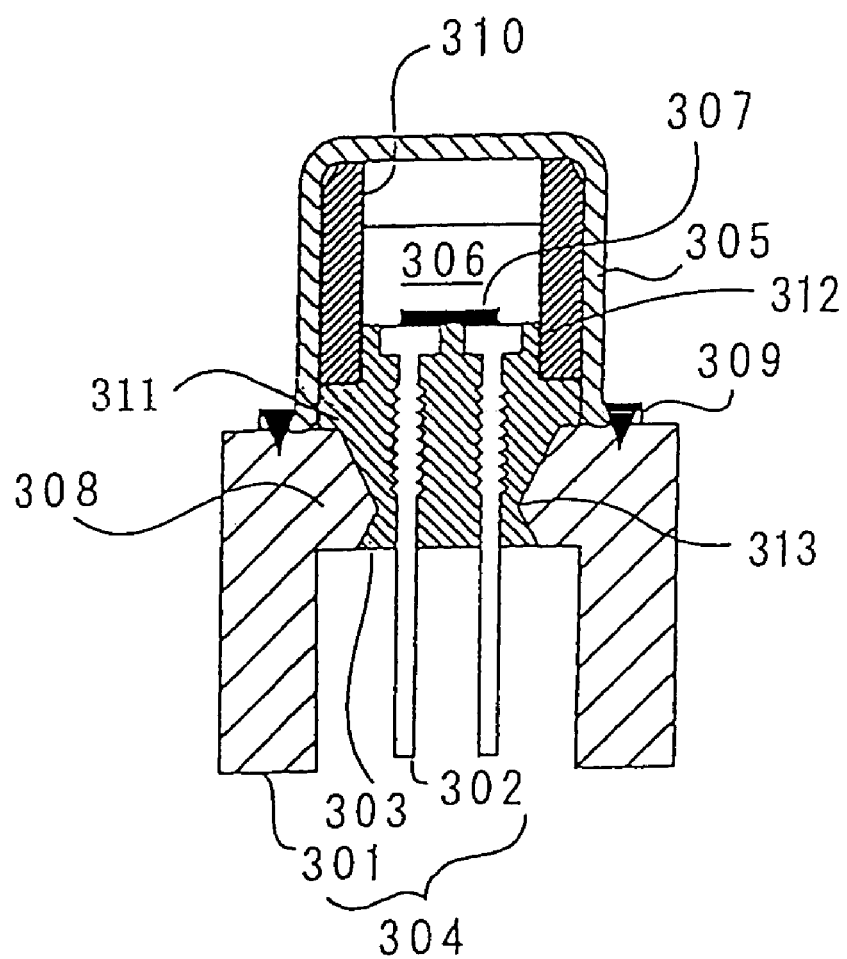
FIG. 3 is a vertical cross sectional schematic view showing one embodiment of an initiator assembly according to the present invention.

FIG. 3 shows an initiator assembly in which a charge holder 310 is used for arranging a priming, a flange 309 is formed in an opening edge of a cover member 305 formed in a cylindrical shape with a top, and the flange of the charge holder is connected to a base portion 304.

In the initiator assembly shown in this drawing, a collar member 301 and a conductive pin 302 are made integral to be the base portion 304, and a bridge wire 307 bridges between conductive pins 302 exposing on the upper end surfaces of the base portion 304. A substantially cylindrical charge holder 310 made of a resin material is mounted to the base portion 304, and a priming 306 is press-loaded into a cavity formed by the base portion 304 and the charge holder 310. Then, the cavity is covered by a cover member 305 in a cylindrical shape with the top, and the cover member 305 is connected to the base portion 304.

The integrally formed base portion 304 fixes the collar member 301 and the conductive pin 302 by charging an insulating material made of a resin material between the cylindrical collar member 301 having an inwardly shaped portion 308 like a flange and two conductive pins 302 arranged to go through between the flange-like portions 308 of the collar member 301 in accordance with an injection molding and forming a header portion 303. That is, the base portion 304 is formed by the collar member 301, two conductive pins 302 and the header portion 303 made of the insulating material.

In the present embodiment, as the insulating material described above, there can be used a resin material such as a polyphenylene sulfide (PPS) containing a glass fiber or another inorganic filling materials, a liquid crystal polymer (LCP) containing an inorganic filling material such as a mineral or the like. The polyphenylene sulfide (PPS) containing 40 weight % of a glass fiber has a dielectric breakdown voltage of 12 MV/m, and the liquid crystal polymer (LCP) containing 50 weight % of a mineral has a dielectric breakdown voltage of 66 MV/m. Further, in the polyphenylene sulfide containing 40 weight % of a glass fiber, a coefficient of water absorption after being submerged for 24 hours at 23° C. is 0.015% and a tensile strength is 196 MPa, and in the liquid crystal polymer containing 50 weight % of a mineral, a coefficient of water absorption after being submerged for 24 hours at 23° C. is 0.04% and a tensile strength is 171 MPa.

A tube portion 311 projected more outwardly in the axial direction than the flange-like portion 308 of the collar member 301 is formed in the header portion 303 formed by injection-molding the resin material (the insulating material) described above, and a stepped notch portion 312 notched in a stepped shape in the peripheral direction is formed in the front end direction of the tube portion 311. Therefore, according to the present invention, the charge holder 310 is fitted to an outer side of the stepped notch portion 312 and is welded.

In the present embodiment, the charge holder 310 and the header portion 303 are formed by using the resin and both members are welded by an ultrasonic welding. Since both members are welded by an ultrasonic welding, the header portion 303 (the resin) welded to the conductive pin 302 is not in contact, so that the bridge wire 307 bridging between the conductive pins 302 is prevented from being broken.

In the integrally formed base portion 304, a falling-out-preventing means for preventing the header portion 303 from falling out and/or separating is formed in a joint portion between the collar member 301 and the header portion 303. In the present embodiment, as the falling-out preventing means described above, a projection 313 is formed on an inner circumferential surface of the flange-like portion 308 in the collar member 301, and the insulating material is charged to correspond with the projection. Accordingly, the inner circumferential surface of the flange-like portion 308 and the header portion 303 are formed so as to be complementarily engaged with each other, thereby preventing the header portion 303 from falling out and/or separating from the collar member 301. Particularly, according to the present embodiment, in the projection 313 formed on the inner circumferential surface of the flange-like portion 308 in the collar member 301, an apical portion is formed in a portion close to a lower portion of the flange-like portion 308. Accordingly, in the header portion 303, a portion above the apical portion of the collar member 301 (that is, a side in which the priming 306 is arranged) is formed so as to obtain a sufficient axial length, whereby obtaining a sufficient shear strength. With this structure, the header portion 303 can be securely held in the collar member 301 even after the priming 306 is ignited and burnt. That is, the portion having the minimum radius of the header portion 303 is formed below to secure a shear strength. In accordance with the present embodiment, the collar member 301 is formed by using a metal, however, since neither of two conductive pins 302 are in contact with the collar member 301, the tefsel cover conventionally used for insulating the conductive pin (the initiator pin) from the cover member is not required in the initiator assembly.

Two conductive pins 302 are arranged in the substantially center of the header portion 303 formed by using the insulating material. The conductive pin 302 is formed so that a top portion thereof is exposed on a front end of the tube portion 311 in the header portion 303, and the bridge wire tightening straight is connected over the top portions. The bridge wire 307 is formed by using an electric resistance body, and has a function of converting an electric energy (an activating signal) received by the conductive pin 302 into a thermal energy. In the present embodiment, a knurl is formed on a circumferential surface of the conductive pin 302 in the range where the molded member (that is, the header portion 303) exists. The knurl is formed as concave and convex surfaces, a rib or a boss formed in the peripheral direction of the conductive pin 302, and blocks entering of the moisture between the conductive pin 302 and the header portion 303, thereby making the assembly of both members secure. In other words, the insulating material is molded corresponding to the concave and convex surfaces, the rib or the boss by forming the concave and convex surfaces, the rib or the boss in the range where the conductive pins 302 exist in the header portion and charging the insulating material between the conductive pins 302 and the collar member 301, and thereby, both members are joined securely.

As described above, the priming 306 charged in the cavity is separated from the ambient air by the periphery thereof being surrounded by the cover member 305 formed in the cylindrical shape with the top. In most cases, the cover member 305 is made of a metal material, and a thickness thereof is adjusted so as to be broken due to a combustion of the priming 306. Accordingly, it is preferable that the cover member 305 has a notch in a circular end portion (a portion forming a top) in such a manner as to be easily and securely broken. The notch described above can be formed radially as a groove of about 0.10 to 0.25 mm in the case of making the cover member 305 of a stainless steel (SUS305).

In the initiator assembly shown in this aspect, the flange 309 is formed in an opening bottom edge of the cover member 305 and the flange 309 is joined to the collar member 301 (the flange-like portion 308) constituting the base portion 304. The cover member 305 and the collar member 301 are joined by a welding method with a small heat gain such as a resistance welding, a laser welding in order to clear the possibility such that the priming 306 is ignited at a time of joining.

Figure 4:
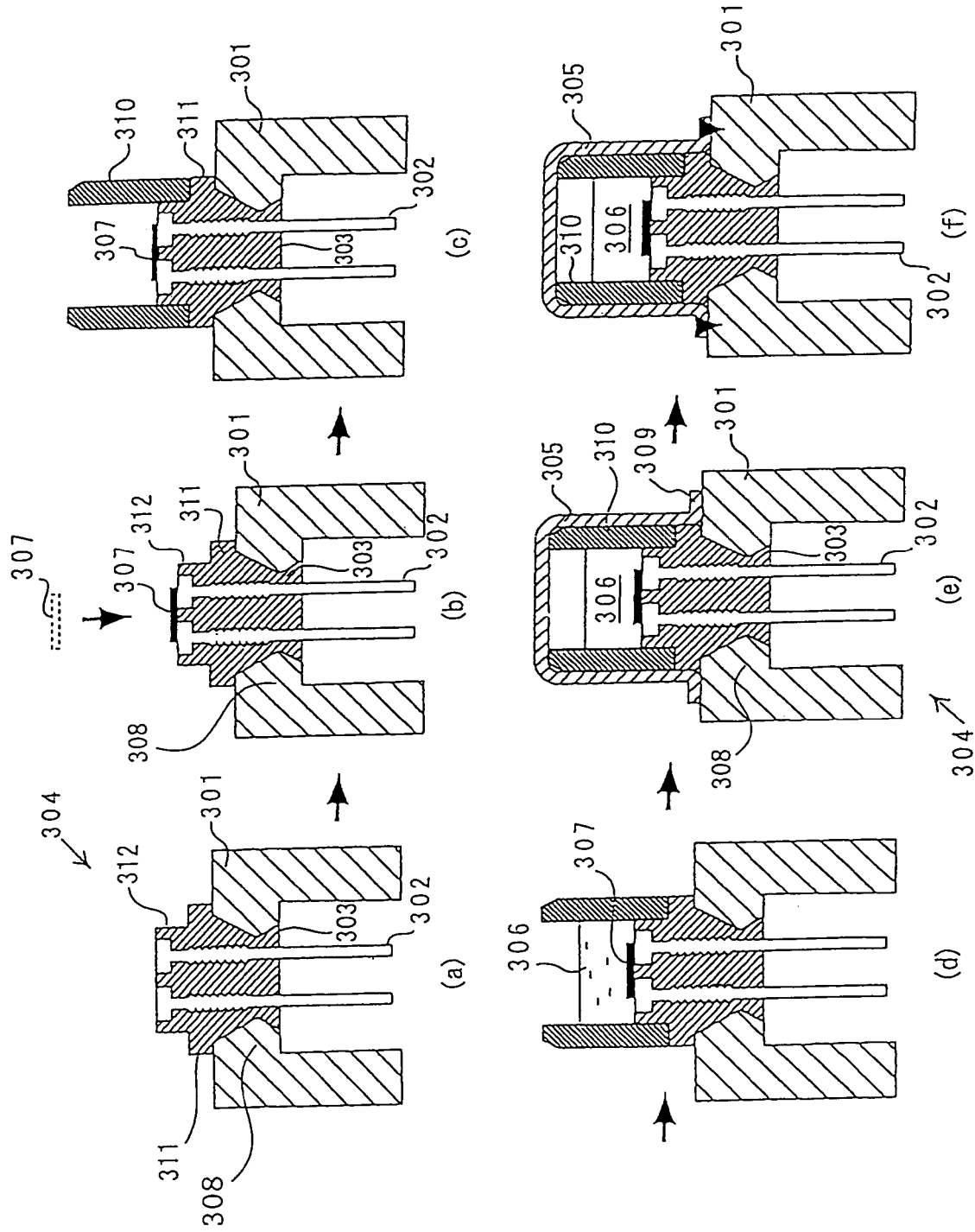
FIG. 4 is a schematic view showing one manufacturing process of the initiator assembly shown in FIG. 3.

The initiator assembly described above can be manufactured in accordance with a process shown in FIG. 4. That is, as shown in (a) of FIG. 4, two conductive pins 302 are inserted from an opening of the flange-like portion 308 of the collar member 301, and the insulating material (the resin material) is charged between the opening portion of the flange-like portion 308 and the conductive pins 302, whereby the base portion 304 is formed. At a time of forming the base portion 304, the insulating material is injection-molded so that the header portion 303 made thereof protrudes outwardly in the axial direction from the flange-like portion 308 of the collar member 301 and a periphery thereof is formed in a notch (312) notched in a stepped shape, and the top portions of the conductive pins 302 are formed on the end surface of the tube portion 311 protruding outwardly in the axial direction of the flange-like portion 308 so as to expose thereon. Then, after polishing the base portion 304, the bridge wire 307 bridges between the conductive pins 302 whose top portions are exposed on the end surface of the header portion 303 made of the insulating material so as to be welded (in (b) of FIG. 4). Further, the charge holder 310 is mounted onto the tube portion 311 of the base portion 304 (the header portion 303) protruding outwardly in the axial direction from the flange-like portion 308 of the collar member 301, and joined by an ultrasonic welding (in (c) of FIG. 4). Thereafter, the priming 306 is press-loaded inside a cavity (a priming storing space) formed by the base portion 304 and the charge holder 310 (in (d) of FIG. 4), the outside of the charge holder 310 is covered with the cover member 305 formed in the cylindrical shape with the top, and the interior of the cavity where the priming 306 is stored is closed (in (e) of FIG. 4). Since the opening bottom edge of the cover member 305 is formed in a flange, a portion formed in the flange 309 is welded to the flange-like portion 308 of the base portion 304 (the collar member 301) (in (f) of FIG. 4). It is desirable that the flange portion 309 of the cover member 305 and the flange-like portion 308 of the collar member 301 are joined according to a welding method with a small heat gain such as a resistance welding, a laser welding.

Since the base portion 304 integrally formed with the collar member 301, the conductive pins 302 and the molded material is used, the initiator assembly shown in this embodiment can be composed of inexpensive parts and the number of the manufacturing steps can be reduced. Therefore, the initiator assembly having a less production cost can be realized. Further, since the initiator assembly can be easily assembled, it is possible to improve the yield.

Further, by adjusting the molding condition of the base portion 304 and forming the knurl on the circumferential surface of the conductive pin, entering of the ambient air between the base portion and the respective conductive pins can be blocked, and like the electric type initiator of Embodiment 1, the electric type initiator can be obtained such that a changing amount of a conductive resistance between a pair of the above conductive pins after standing for 1000 hours in a state of flowing electric current of 50 mA to the bridge wire, under the environment of a temperature of 80° C. and a humidity of 95% can be within ±0.2 Ω with respect to a value before standing, preferably within ±0.1 Ω, and more preferably within ±0.05 Ω, and further, an ignition starting timing of the priming can be equal to or less than 2 msec after applying an igniting electric current for starting the electric type initiator.

Embodiment 3

Figure 5:
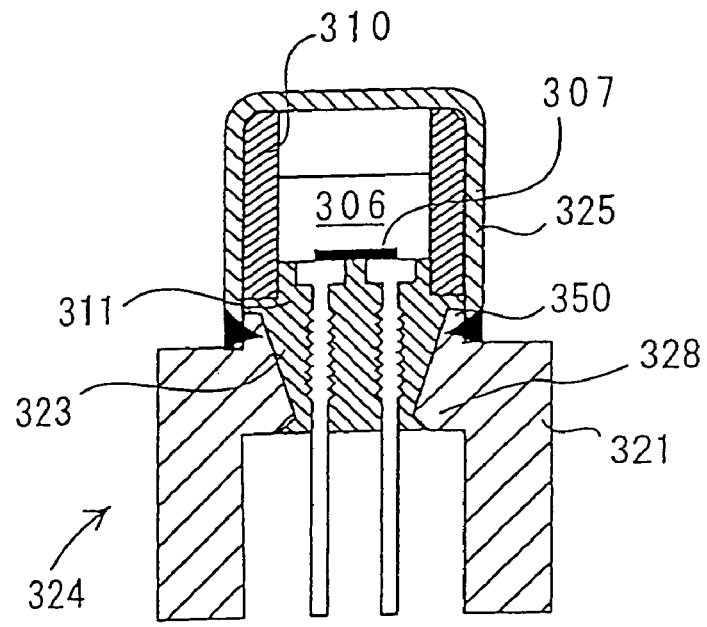
FIG. 5 is a vertical cross sectional schematic view showing other embodiment of an initiator assembly according to the present invention.

An initiator assembly shown in FIG. 5 is particularly characterized by a connecting structure and a connecting method between a cover member 325 covering the outside of the charge holder 310 and closing the cavity storing the priming 306, and a collar member 321 constituting the base portion 324.

That is, in the initiator assembly shown in FIG. 5, an annular portion 350 having a flange 328 projecting outwardly in the axial direction is formed in the collar member 321 constituting the base portion 324, and in the base portion 324 comprising the collar member 321, a front end of the flange 328 of the collar member 321 projects outwardly in the axial direction and continuously, a header portion 323 composed of the insulating material projects cylindrically. An outer circumferential surface of the annular portion 350 projecting from the collar member 321 and an outer circumferential surface of the cylindrical portion 311 of the header portion 323 are made flush, and both members are fitted and inserted into the cover member 325 formed in a cylindrical shape with a top. Further, the cover member 325 and the collar 321 of the base portion 324 are welded at an opening circumferential edge of the cover member 325. Accordingly, in the present embodiment, the cover member 325 and the collar member 321 of the base portion 324 are horizontally welded.

Most of the components of the initiator assembly shown in this embodiment are the same as those of the initiator assembly shown in FIG. 3. Therefore, the same reference numerals in FIG. 5 are attached to the same components described in FIG. 3, and a description thereof will be omitted. Further, the same effects as those of the Embodiment 2 can be obtained.

Embodiment 4

Figure 6:
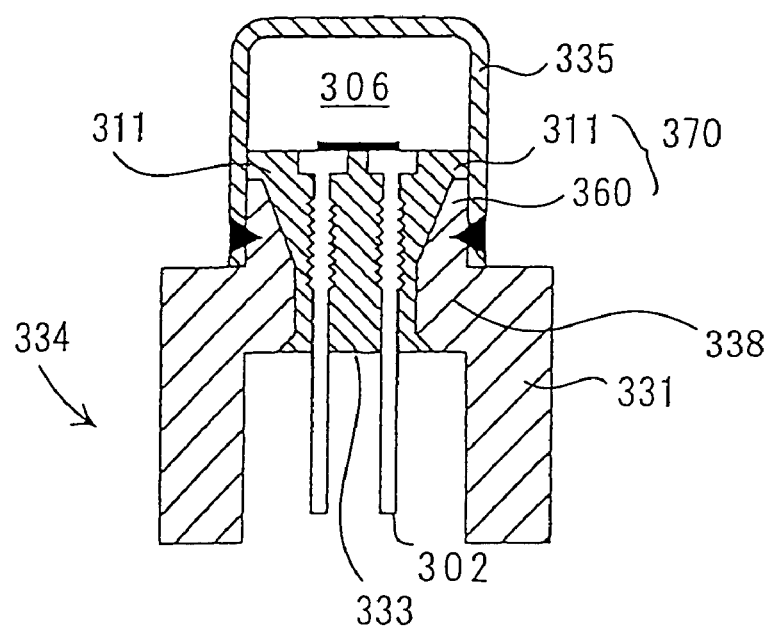
FIG. 6 is a vertical cross sectional schematic view showing other embodiment of an initiator assembly according to the present invention.

An initiator assembly shown in FIG. 6 is particularly characterized by a press-loading method of the priming 306 and a structure therefor, in connection to the Embodiments 2 and 3. Further, in the initiator assembly shown in this embodiment, a header portion 333 is made of a resin material.

That is, in the initiator assembly shown in this embodiment, in the same manner as that of Embodiment 3 described above, an annular portion 360 is formed in a collar member 331 constituting a base portion 334 in such a manner as to project a front end of a flange 338 outwardly in the axial direction of the collar member 331. Continuously from the annular portion 360, a tube portion 311 is formed in such a manner as to project cylindrically the header portion 333 made of the insulating material, and a press-loading portion 370 is formed with the annular portion 360 of the collar member 331 and the tube portion 311 of the header portion 333. That is, in the present embodiment, an end surface thereof in the side where the top portions of the conductive pins 302 are exposed is projected cylindrically and outwardly in the axial direction to form the press-loading portion 370 in the base portion 334.

According to the present embodiment, in order to form the press-loading portion 370 in the base portion 334 as described above, an inner side of the flange portion 338 of the collar member 331 is partly formed in a cylindrical shape. This is for avoiding the case such that the header portion 333 made of the insulating material is separated from the collar member 331, securing a strength of the header portion 333 and avoiding the case such that the collar member 331 contacts with the conductive pin 302.

The press-loading portion 370 formed in the base portion 334 as described above is fitted and inserted into the cover member 335 in a cylindrical shape with a top so as to press-load the priming 306 stored in the cover member 335. The header portion 333 is made of a resin material, and a sealing property is kept thereby. Further, the initiator assembly shown in this embodiment can be formed in accordance with a method shown in FIG. 7.

Figure 7:
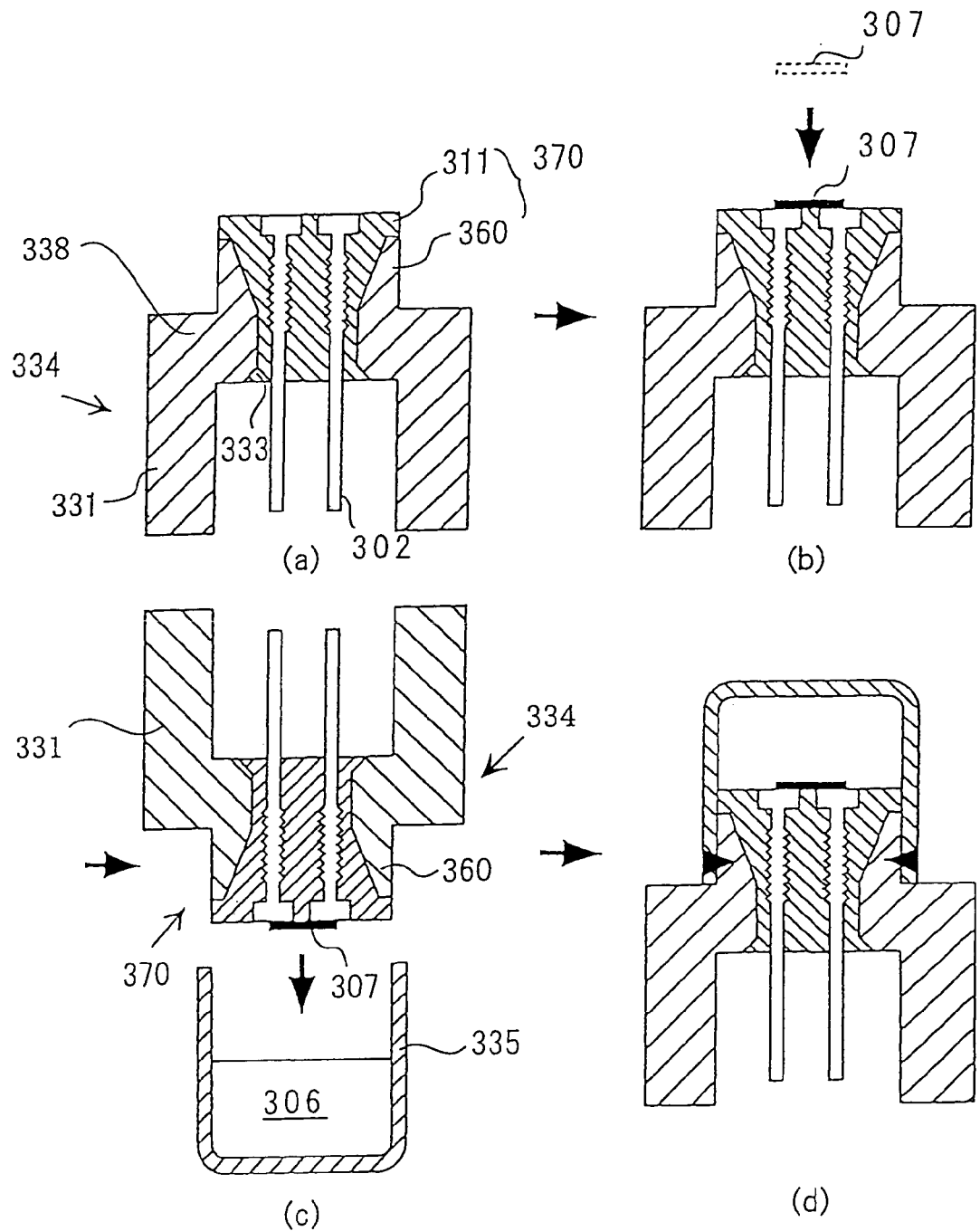
FIG. 7 is a schematic view showing one manufacturing process of the initiator assembly shown in FIG. 6.

That is, at first, in the same manner as that in (a) of FIG. 4, two conductive pins 302 are inserted from an opening portion of the flange portion 338 of the collar member 331 and the insulating material (the resin material) is charged between the opening portion of the flange portion and the conductive pins 302 to form the base portion 334 (in (a) of FIG. 7).

However, in this embodiment, as described above, the end surface in the side where the top portions of the conductive pins 302 is exposed is projected cylindrically and outwardly in the axial direction to form the press-loading portion 370 in the base portion 334, and the top portions of the conductive pins 302 are formed to expose on the end surface of the press-loading portion 370 projecting outwardly in the axial direction of the flange portion 338. Consequently, the bridge wire 307 bridges between the conductive pins 302 whose top portions are exposed on the end surface of the header portion 333 made of the insulating material and is welded (in (b) of FIG. 7), and a predetermined amount of the priming 306 is weighed and stored inside the cover member 335 in a cylindrical shape with the top. The press-load portion 370 of the base portion 334 is inserted to the cover member 335 in which the priming 306 is stored, from the opening side thereof (in (c) of FIG. 7), and the priming 306 in the cover member 335 is press-loaded by the end surface. Then, in a stage that the priming 306 is press-loaded to the sufficient level, the opening side of the cover member 335 is horizontally welded to the annular portion 360 in the collar member 331 of the base portion 334, whereby both members are joined (in (d) of FIG. 7). The cover member 335 and the annular portion 360 are joined by a welding method with a small amount of heat gain such as a resistance welding, a laser welding.

In accordance with the initiator assembly of the present embodiment formed in the manner described above, since the priming 306 is weighed and directly press-loaded in the cover member 335 at the base portion 334 (the press-loading portion), the charge holder 310 used in Embodiments 2 and 3 is not required. Therefore, a cost of the charge holder 310 itself and a cost for mounting it can be omitted, and also a process for mounting the charge holder 310 can be omitted. As a result, an initiator assembly which is further advantageous in a manufacturing process and a manufacturing cost can be realized.

Also in the present embodiment, by adjusting the molding condition of the base portion 334 and forming the knurl on the circumferential surface of the conductive pin, entering of the ambient air between the base portion and the respective conductive pins can be blocked, and like the electric type initiator of Embodiment 1, the electric type initiator can be obtained such that a changing amount of a conductive resistance between a pair of the above conductive pins after standing for 1000 hours in a state of flowing electric current of 50 mA to the bridge wire, under the environment of a temperature of 80° C. and a humidity of 95% can be within ±0.2 Ω with respect to a value before standing, preferably within ±0.1 Ω, and more preferably within ±0.05 Ω, and further, an ignition starting timing of the priming can be equal to or less than 2 msec after applying an igniting electric current for starting the electric type initiator.

Embodiment 5

Figure 8:
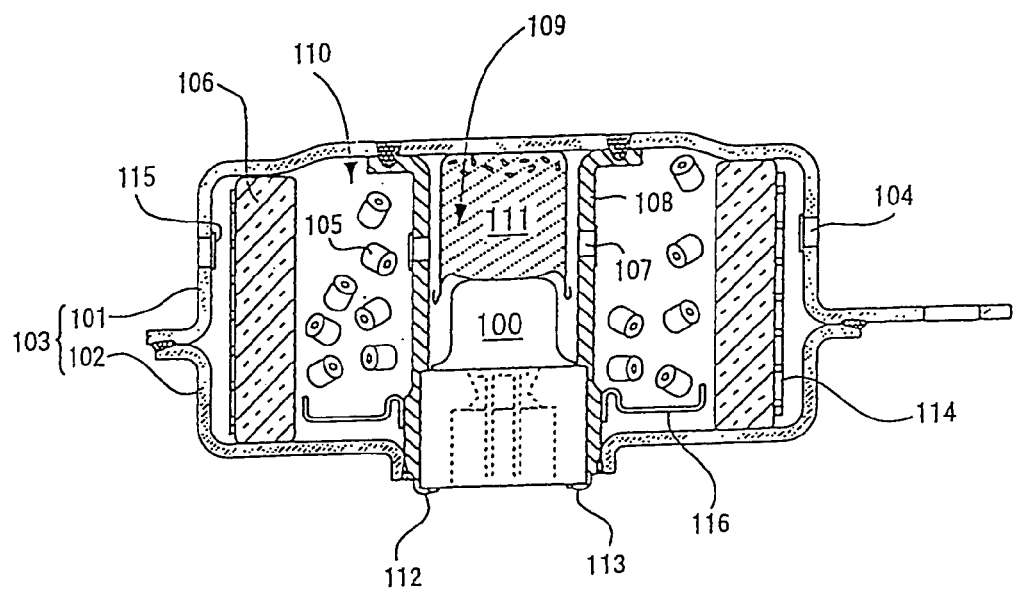
FIG. 8 is a vertical cross sectional schematic view showing one embodiment of a gas generator for an air bag according to the present invention.
Figure 9:
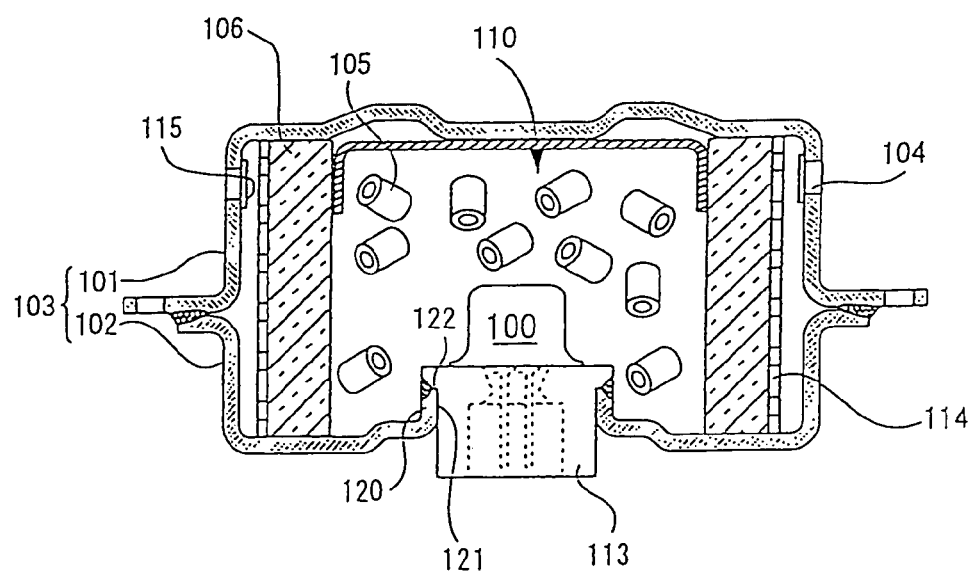
FIG. 9 is a vertical cross sectional schematic view showing other embodiment of a gas generator for an air bag according to the present invention.

FIGS. 8 and 9 show an embodiment of a gas generator for an air bag formed by using the initiator assembly shown in Embodiments 2 to 4 described above.

In the gas generator, a housing is formed by combining a diffuser shell 101 in which a gas discharge port 104 is formed and a closure shell 102 closing the diffuser shell, and the housing 103 includes an igniting means comprising the initiator assembly 100 and a gas generating means 105 to be ignited and burnt upon activation of the igniting means for generating a working gas to inflate an air bag (a bag body) and a filter means 106 for purifying and/or cooling the working gas generated by combustion of the gas generating means 105.

In the gas generator shown in FIG. 8, an inner cylindrical member 108 provided with a plurality of flame-transferring ports 107 on a circumferential wall is arranged in the center inside the housing, a space 109 for storing the igniting means is formed inside the inner cylindrical member 108, and a combustion chamber 110 for storing the gas generating means 105 is formed in the outside thereof in the radial direction.

In the gas generator in the aspect shown in FIG. 8, the igniting means comprises the initiator assembly 100 shown in the embodiments described above, and a transfer charge 111 to be ignited and burnt upon activation of the initiator assembly and ejecting a flame for igniting the gas generating means from the flame-transferring ports 107. Among these, the initiator assembly 100 is fixed to the lower portion of the inner cylindrical member 108. A combination of the inner cylindrical member 108 and the initiator assembly 100 can be obtained by crimping an end portion 112 of the opening in the inner cylindrical member 108 and fixing the collar member 113 of the initiator assembly 100. Further, in the inner cylindrical member 108, the opening end portion 112 in the side where the initiator assembly 100 is received is joined to the closure shell 102 by a welding or the like.

The gas generating means 105 is stored in the combustion chamber 110, and the filter means 106 for purifying and/or cooling the working gas generated due to the combustion of the gas generating means 105 is arranged outside the same. The filter means 106 is formed in a cylindrical shape by using a laminated wire mesh or the like, and the outer circumferential surface thereof is arranged opposite to the inner circumferential surface of the housing 103. Desirably, a gap forming a gas-flow path is formed between the outer circumferential surface of the filter means 106 and the inner circumferential surface of the housing 103, whereby the entire portion of the filter means 106 can be used. The outer circumferential surface of the filter means 106 is supported by a punching plate 114 formed in a porous cylindrical shape, thereby being suppressed expansion of the filter outwardly in the radial direction.

In the gas generator described above, when the initiator assembly 100 is activated, the transfer charge 111 arranged in the vicinity of the assembly is ignited and burnt, and the flame thereof is ejected into the combustion chamber 110 through the flame-transferring ports 107 formed in the inner cylindrical member 108. Due to the flame, the gas generating means 105 in the combustion chamber 110 is ignited and burnt to generate a working gas. The working gas is purified and/or cooled during passing through the filter means 106, breaks a seal tap 115 closing the gas discharge port 104 and is discharged from the gas discharge port 104. In this case, in FIG. 8, the reference numeral 116 denotes an under plate formed in a substantially ring shape. This under plate 116 has a function of supporting the gas generating means inside the combustion chamber 110.

Further, the initiator assembly shown in Embodiments 2 to 4 described above can be also used in a gas generator shown in FIG. 9. The gas generator shown in this drawing is different from the gas generator shown in FIG. 8, and does not include an inner cylindrical member (the reference numeral 108 in FIG. 8) in the housing. Accordingly, the generator is particularly characterized by a structure of the igniting means and a method of the arranging.

That is, in the gas generator shown in this drawing, the initiator assembly 100 is directly mounted to the closure shell 102 and the gas generating means 105 is arranged in the periphery thereof. Therfore, in the gas generator shown in this drawing, the transfer charge (the reference numeral 111 in FIG. 8) is not used, and when the initiator assembly 100 is activated, the flame thereof directly ignites and burns the gas generating means 105 to generate a working gas for inflating the air bag.

In particular, in the aspect shown in this drawing, a central opening 121 provided with an inwardly bent circumferential wall portion 120 is formed in the substantially center of the closure shell forming the housing, the initiator assembly 100 is received in the central opening 121, and an end surface of the circumferential wall portion 120 in the central opening 121 and the collar member 113 of the initiator assembly 100 are connected. Both members can be connected by suitable means such as a welding to fix the collar member of the initiator assembly. By forming a stepped notch portion 122 in the collar member of the initiator assembly 100 and bringing it into contact with the end surface of the circumferential wall portion in the central opening 121 as shown in this drawing, the initiator assembly is securely fixed and a risk such that the assembly is fallen out at a time of activation can be cleared. In FIG. 9, the same reference numerals are attached to the same members as those in FIG. 3, and a description thereof will be omitted.

Embodiment 6

Figure 10:
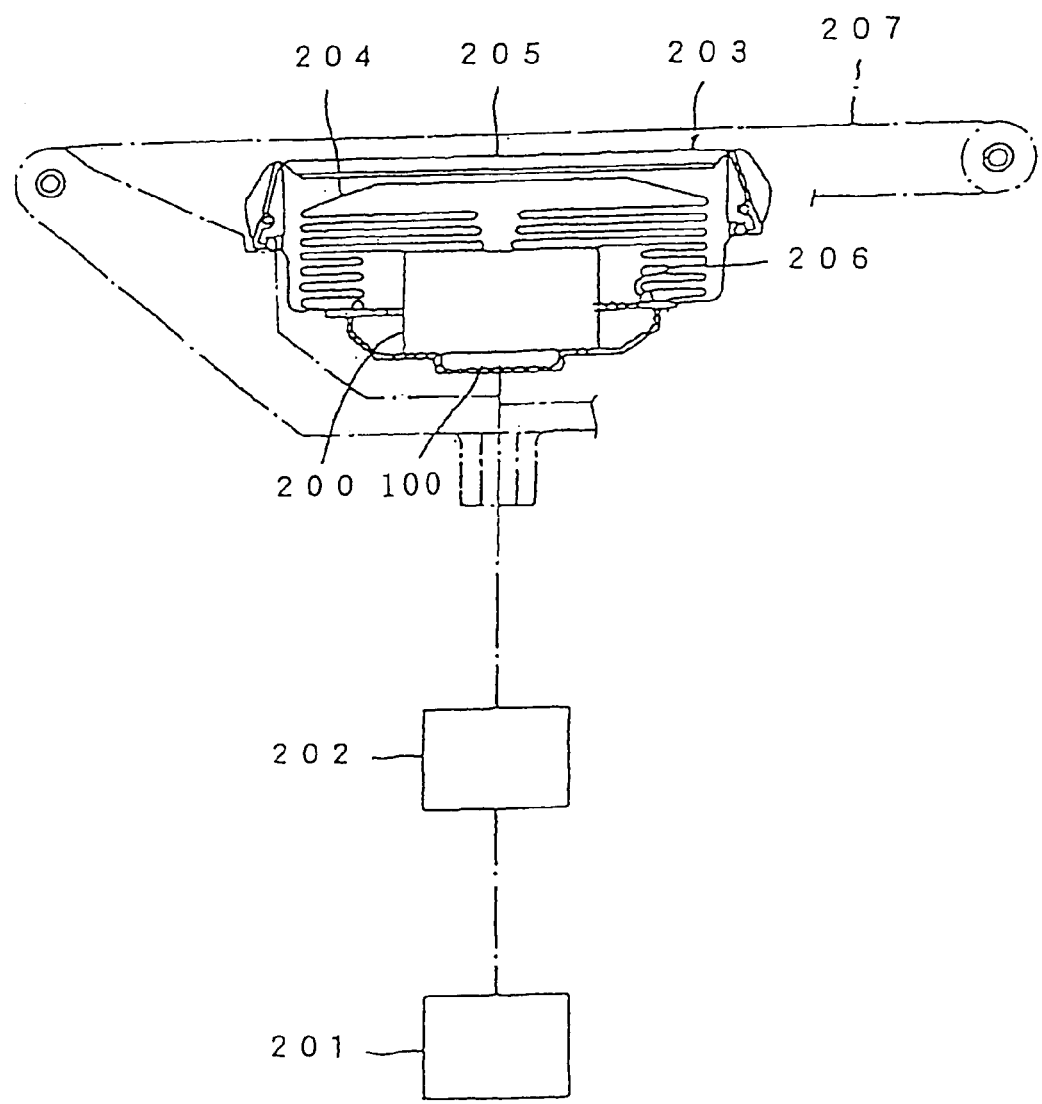
FIG. 10 is a schematic view of a structure of an air bag apparatus according to the present invention.

FIG. 10 shows an embodiment of an air bag apparatus according to the present invention which includes a gas generator using an electric igniting type igniting means.

The air bag apparatus comprises a gas generator 200, an impact sensor 201, a control unit 202, a module case 203 and an air bag 204. The gas generator 200 employs the gas generator described in FIGS. 8 and 9, and an operating performance is adjusted so as to apply the impact as little as possible to a passenger, at the initial stage of the activation of the gas generator.

The impact sensor 201 may, for example, comprises a semiconductor type acceleration sensor. The semiconductor type acceleration sensor is structured such that four semiconductor strain gauges are formed on a beam of a silicon substrate which is bent when an acceleration is applied, and the semiconductor strain gauges are bridge-connected. When the acceleration is applied, a beam is bent and a strain is generated on the surface. Due to the strain, a resistance of the semiconductor strain gauge is changed and the resistance change is detected as a voltage signal in proportion to the acceleration.

The control unit 202 is provided with an ignition judging circuit, and a signal outputted from the semiconductor type acceleration sensor is inputted to the ignition judging circuit. The control unit 202 starts calculation at a time when the impact signal outputted from the sensor 201 becomes more than a certain value, and when a calculated result becomes more than a certain value, the control unit 202 outputs the activation signal to the initiator assembly 100 of the gas generator 200.

The module case 203 is made, for example, of a polyurethane, and includes the module cover 205. The air bag 204 and the gas generator 200 are stored in the module case 203 so as to be constituted as a pad module. The pad module is normally mounted to a steering wheel 207 in the case of being mounted to a driver side of a motor vehicle.

The air bag 204 is made of a nylon (for example, a nylon 66), a polyester or the like, and is fixed to the flange portion of the gas generator in a folded state so that a bag port 206 thereof surrounds a gas discharge port of the gas generator.

When the semiconductor type acceleration sensor 201 detects the impact at a time when the motor vehicle is collided, the signal is transmitted to the control unit 202 and the control unit 202 starts calculation at a time when the impact signal outputted from the sensor becomes more than a certain value. When the calculated result becomes more than a certain value, the control unit 202 outputs the activation signal to the initiator assembly 100 of the gas generator 200. Accordingly, the initiator assembly 100 is activated so as to ignite the gas generating agent, and the gas generating agent is burnt to generate a gas. The gas is ejected into the air bag 204, whereby the air bag breaks the module cover 205 to inflate, thereby forming a cushion absorbing an impact between the steering wheel 207 and the passenger.

Figure 11:
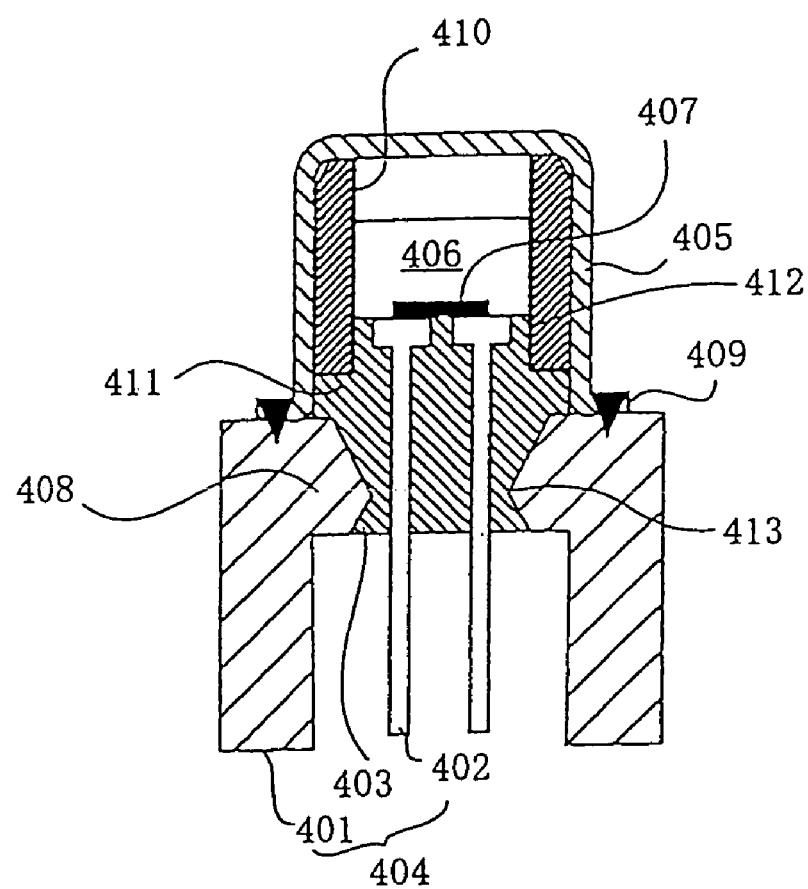
FIG. 11 is a vertical cross sectional schematic view showing one embodiment of an initiator assembly according to the present invention.
Figure 13:
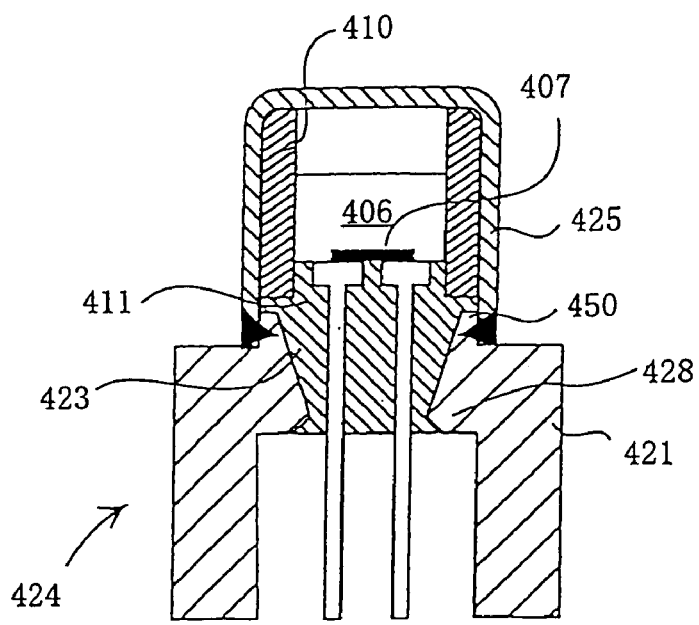
FIG. 13 is a vertical cross sectional schematic view showing other embodiment of an initiator assembly according to the present invention.
Figure 14:
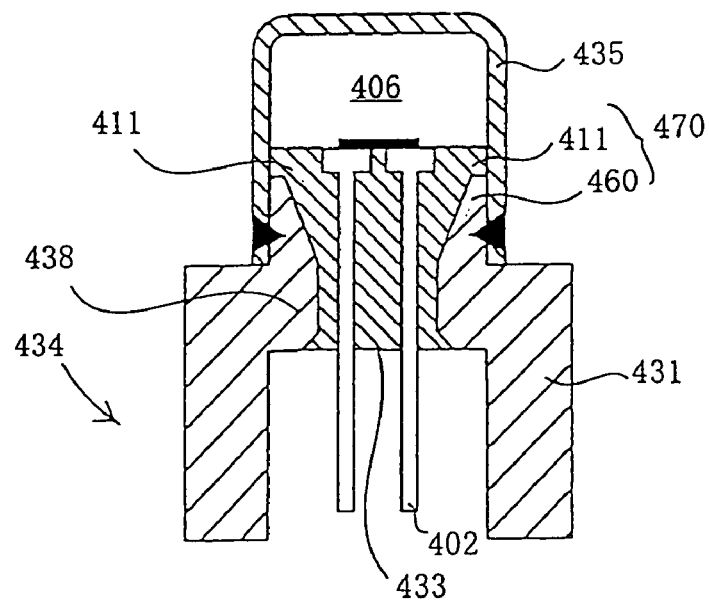
FIG. 14 is a vertical cross sectional schematic view showing other embodiment of an initiator assembly according to the present invention.

FIGS. 11, 13 and 14 illustrate preferred embodiments of initiator assemblies usable for an inflator to inflate an air bag in a motor vehicle or an inflatable article.

Embodiment 7

FIG. 11 shows an initiator assembly in which a charge holder 410 is used for arranging the priming and a flange 409 is formed in an opening edge of a cover member 405 having a cylindrical shape with a top so as to be connected to a base portion 404.

In the initiator assembly shown in this drawing, a base portion 404 is integrally formed to include a collar member 401 and a conductive pin 402, and a bridge wire 407 bridges between the conductive pins 402 exposing on the upper end surface of the base portion 404. A substantially cylindrical charge holder 410 formed by using a resin material is mounted to the base portion 404, and a priming 406 is press-loaded inside a cavity formed by the base portion 404 and the charge holder 410. The cavity is covered with the cover member 405 formed in a cylindrical shape with a top, and the cover member 405 is connected to the base portion 404.

The integrally formed base portion 404 fixes the collar member 401 and the conductive pins 402 by charging an insulating material (403) made of a resin material between the cylindrical collar member 401 having an inwardly shaped portion 408 like a flange and two conductive pins 402 arranged to go through between the flange-like portions 408 of the collar member 401, in accordance with an injection-molding. In other words, the base portion 404 comprises the collar member 401, two conductive pins 402 and the molded member 403 made of the insulating material. In the present embodiment, as the insulating material described above, there can be used a resin material such as a polyphenylene sulfide (PPS) containing a glass fiber or another inorganic filling materials, a liquid crystal polymer (LCP) containing an inorganic filling material such as a mineral. The polyphenylene sulfide (PPS) containing 40 weight % of a glass fiber has a dielectric breakdown voltage of 12 MV/m, and the liquid crystal polymer (LCP) containing 50 weight % of a mineral has a dielectric breakdown voltage of 66 MV/m. Further, in the polyphenylene sulfide containing 40 weight % of a glass fiber, a coefficient of water absorption after being submerged for 24 hours at 23° C. is 0.015% and a tensile strength is 196 MPa, and in the liquid crystal polymer containing 50 weight % of a mineral, a coefficient of water absorption after being submerged for 24 hours at 23° C. is 0.04% and a tensile strength is 171 MPa.

A tube portion 411 projected more outwardly in the axial direction than the flange-like portion 408 of the collar member 401 is formed in the moleded portion 403 formed by injection-molding the resin material (the insulating material) as described above, and a stepped notch portion 412 step-notched in the peripheral direction is formed in the front end direction of the tube portion 411. Therefore, in the present invention, the charge holder 410 is fitted to the outside of the stepped notch portion 412 to be welded.

In the present embodiment, the charge holder 410 and the molded member 403 are made of the resin and both members are welded by an ultrasonic welding. Since both members are welded by an ultrasonic welding, the molded member 403 (the resin) welded to the conductive pin 402 is not in contact, so that the bridge wire 407 spanned between the conductive pins 402 is prevented from being broken.

In the integrally formed base portion 404, falling-out preventing means for preventing the molded member 403 from being fallen out and/or separated is formed in a joint portion between the collar member 401 and the molded member 403. In the present embodiment, as the falling-out preventing means described above, a projection 413 is formed on an inner circumferential surface of the flange-like portion 408 in the collar member 401, and the insulating material (403) is charged to be corresponded to the projection. Accordingly, the inner circumferential surface of the flange portion 408 and the molded member 403 are formed so as to be complementarily engaged with each other, thereby preventing the molded member 403 from being fallen out and/or separated from the collar member 401. Particularly in the present embodiment, in the projection 413 formed on the inner circumferential surface of the flange-like portion 408 in the collar member 401, a top portion is formed in the lower portion of the flange portion 408. Accordingly, in the molded member 403, a portion above the top portion of the collar member 401 (that is, a side where the priming 406 is arranged) is formed to have a sufficient axial length as well as a sufficient shear strength, whereby the molded member 403 can be securely held in the collar member 401 even after the priming 406 is ignited and burnt. That is, the minimum radial portion of the molded member 403 is formed in a lower portion thereof to secure a shear strength. In accordance with this embodiment, the collar member 401 is formed by using a metal. And, since neither of two conductive pins 402 are in contact with the collar member 401, the tefsel cover conventionally used for insulating a conductive pin (an initiator pin) from a cover member is not required in the initiator assembly shown in the present embodiment.

Two conductive pins 402 are arranged in the substantially center of the molded member 403 made of the insulating material. The conductive pins 402 are formed so that top portions thereof are exposed on the front end of the tube portion 411 in the molded member 403, and the bridge wire 407 tightening straight is connected over the top portions. The bridge wire 407 is made of an electric resistance body, and has a function of converting an electric energy (an activating signal) received by the conductive pin 402 into a thermal energy. In the present embodiment, a knurl is formed on a circumferential surface in the portion existing in the molded member of the conductive pin 2. The knurl can be formed as concave and convex surfaces, a rib or a boss formed in the peripheral direction of the conductive pin 402, and prevents the moisture from entering between the conductive pins 402 and the molded member 403, thereby making an assembly of both members secure. That is, the concave and convex surfaces, the rib or the boss is formed in the portion existing in the molded member of the conductive pins, and accordingly, the insulating material (403) is molded in correspondence to the concave and convex surfaces, the rib or the boss by charging the insulating material (403) between the conductive pins 402 and the collar member 401 to make two members securely connected.

As described above, the priming 406 charged in the cavity is separated from the ambient air, being surrounded with the periphery thereof by the cover member 405 formed in a cylindrical shape with a top. In most cases, the cover member 405 is made of a metal material, and a thickness thereof is adjusted so as to be broken due to a combustion of the priming 406. Accordingly, the cover member 405 is preferably provided with a notch in a circular end portion (a portion forming a top) so as to be easily and unfailingly broken. The notch described above can be formed radially as a groove of about 0.10 to 0.25 mm in the case of forming the cover member 405 by using a stainless steel (SUS305).

In the initiator assembly shown in this aspect, the flange 409 is formed in an opening bottom edge of the cover member 405 and the flange 409 is joined to the collar member 401 (the flange-like portion 408) constituting the base portion 404. The cover member 405 and the collar member 401 are joined by a welding method with a small heat gain such as a resistance welding, a laser welding in order to prevent the priming 406 from being ignited at a time of joining both members.

Figure 12:
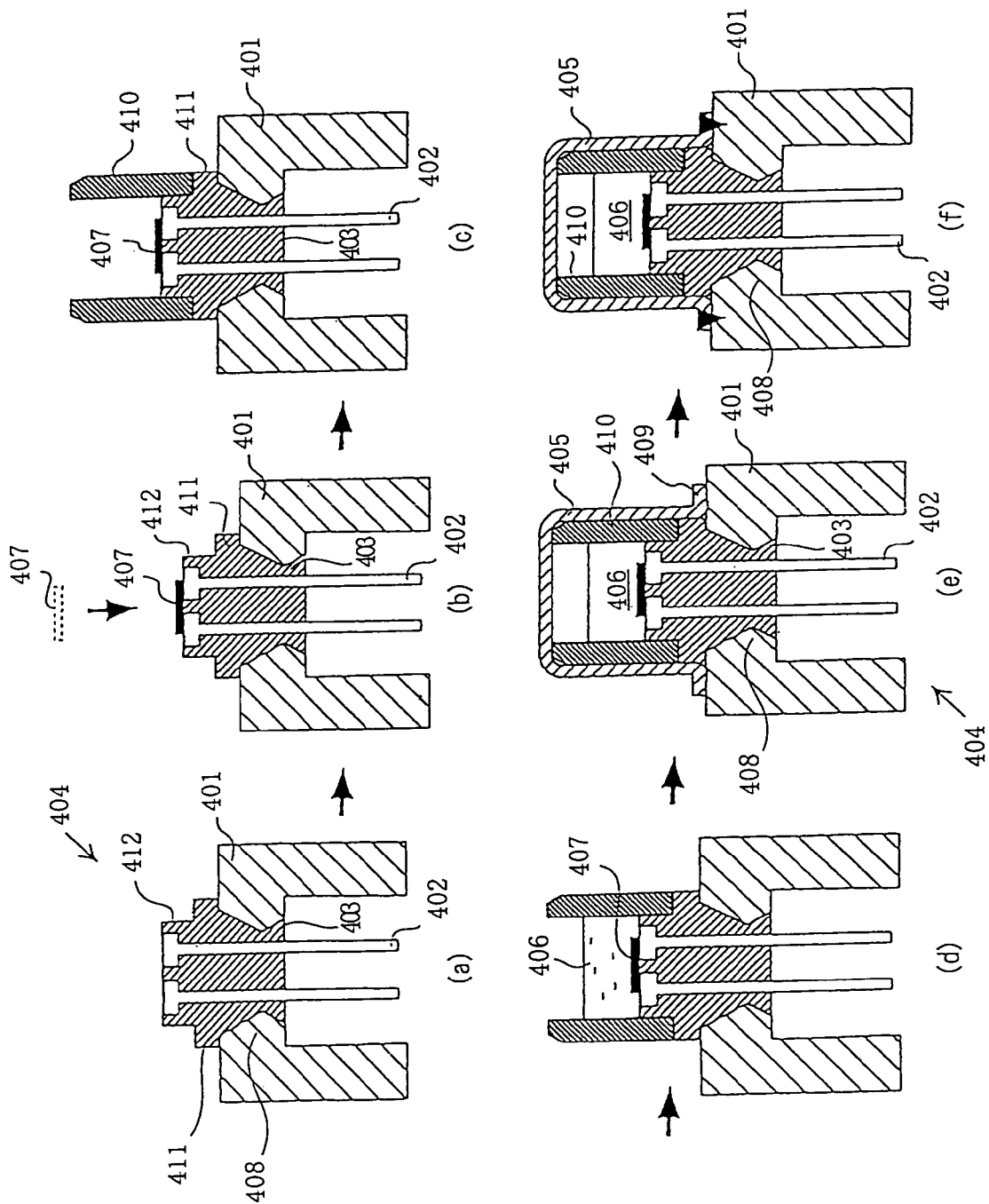
FIG. 12 is a schematic view showing a manufacturing process of the initiator assembly shown in FIG. 11.

The initiator assembly described above can be manufactured in accordance with a process shown in FIG. 12. That is, as shown in (a) of FIG. 12, two conductive pins 402 are inserted from an opening portion of the flange-like portion 408 of the collar member 401, and the insulating material (the resin material) is charged between the opening of the flange-like portion 408 and the conductive pins 402 to form the base portion 404 is formed. At a time of forming the base portion 404, the insulating material is injection-molded so that the molded member 403 made thereof protrudes outwardly in the axial direction from the flange-like portion 408 of the collar member 401 and the periphery thereof is formed to have a step-notched portion (412), and further, the top portions of the conductive pins 402 are arranged to be exposed on the end surface of the tube portion 411 protruding outwardly in the axial direction of the flange portion 408. Then, after polishing the base portion 404, the bridge wire 407 bridges over the conductive pins 402 whose top portions are exposed on the end surface of the molded member 403 made of the insulating material to be welded ((b) in FIG. 12). Further, the charge holder 410 is assembled to the tube portion 411 of the base portion 404 (the molded member 403) formed so as to protrude outwardly in the axial direction from the flange-like portion 408 of the collar member 401, and joined by an ultrasonic welding ((c) in FIG. 12). Thereafter, the priming 406 is press-loaded inside a cavity (a priming storing space) formed by the base portion 404 and the charge holder 410 ((d) in FIG. 12), the outside of the charge holder 410 is covered with the cover member 405 formed in a cylindrical shape with a top, and the interior of the cavity in which the priming 406 is stored is closed ((e) in FIG. 12). Since the opening bottom edge of the cover member 405 is formed in a flange shape, the portion formed in the flange 409 is welded to the flange-like portion 408 of the base portion 404 (the collar member 401) ((f) in FIG. 12). It is desirable that the flange portion 409 of the cover member 405 and the flange-like portion 408 of the collar member 401 are joined by a welding method with a small heat gain such as a resistance welding, a laser welding.

Since the base portion 404 integrally formed with the collar member 401, the conductive pins 402 and the molded material is used, the initiator assembly shown in this embodiment can be composed of inexpensive parts and the number of the manufacturing steps can be reduced. Therefore, the initiator assembly with a less production cost can be realized. Further, since the initiator assembly can be easily assembled, it is possible to improve the yield.

Embodiment 8

An initiator assembly shown in FIG. 13 is particularly characterized by a connecting structure and a connecting method between a cover member 425 covering the outside of the charge holder 410 and closing the cavity storing the priming 406, and a collar member 421 constituting the base portion 424.

That is, in the initiator assembly shown in FIG. 13, an annular portion 450 is formed in the collar member 421 constituting the base portion 424 by making a front end of a flange-like portion 428 project outwardly in the axial direction, and in the base portion 424 formed by using the collar member 421, a front end of the flange-like portion 428 in the collar member 421 projects outwardly in the axial direction and a molded member 423 made of the insulating material projects cylindrically. An outer circumferential surface of the annular portion 450 projecting from the collar member 421 and an outer circumferential surface of the cylindrical portion 411 of the molded member 423 are flush-formed, and both members are fitted and inserted into the cover member 425 formed in a cylindrical shape with a top. Further, the cover member 425 and the collar member 421 of the base portion 424 are welded at the opening circumferential edge of the cover member 425. Accordingly, in the present embodiment, the cover member 425 and the collar member 421 of the base portion 424 are horizontally welded.

The structure of the initiator assembly shown in this embodiment is almost the same as that of the initiator assembly shown in FIG. 11. Accordingly, the same reference numerals in FIG. 13 are attached to as these in FIG. 11, and a description thereof will be omitted.

Embodiment 9

An initiator assembly shown in FIG. 14 is particularly characterized by a press-loading method of the priming 406 and a structure therefor, in relation to Embodiments 7 and 8.

That is, in the initiator assembly shown in this embodiment, in the same manner as that of Embodiment 8 described above, an annular portion 460 is formed in a collar member 431 constituting a base portion 434 by making a front end of a flange-like portion 438 project outwardly in the axial direction of the collar member 431. A tube portion 411 is formed in a front portion of the annular portion 460 in such a manner as to cylindrically project the molded member 433 made of the insulating material, and a press-loading portion 470 is formed by the annular portion 460 of the collar member 431 and the tube portion 411 of the molded member 433. That is, in the present embodiment, an end surface in a side where the top portions of the conductive pins 402 are exposed is projected outwardly and cylindrically in the axial direction to form the press-loading portion 470 in the base portion 434.

In accordance with the present embodiment, in order to form the press-loading portion 470 in the base portion 434 as described above, an inside of the flange-like portion 438 in the collar member 431 is partly formed in a cylindrical shape. This is for avoiding such a case that the molded member 433 made of the insulating material is separated from the collar member 431, securing a strength of the molded member 433, and also avoiding such a case that the collar member 431 is brought into contact with the conductive pins 402.

The press-loading portion formed in the base portion 434 as described above is fitted and inserted into the cover member 435 having a cylindrical shape with a top to press-load the priming 406 stored in the cover member 435.

Figure 15:
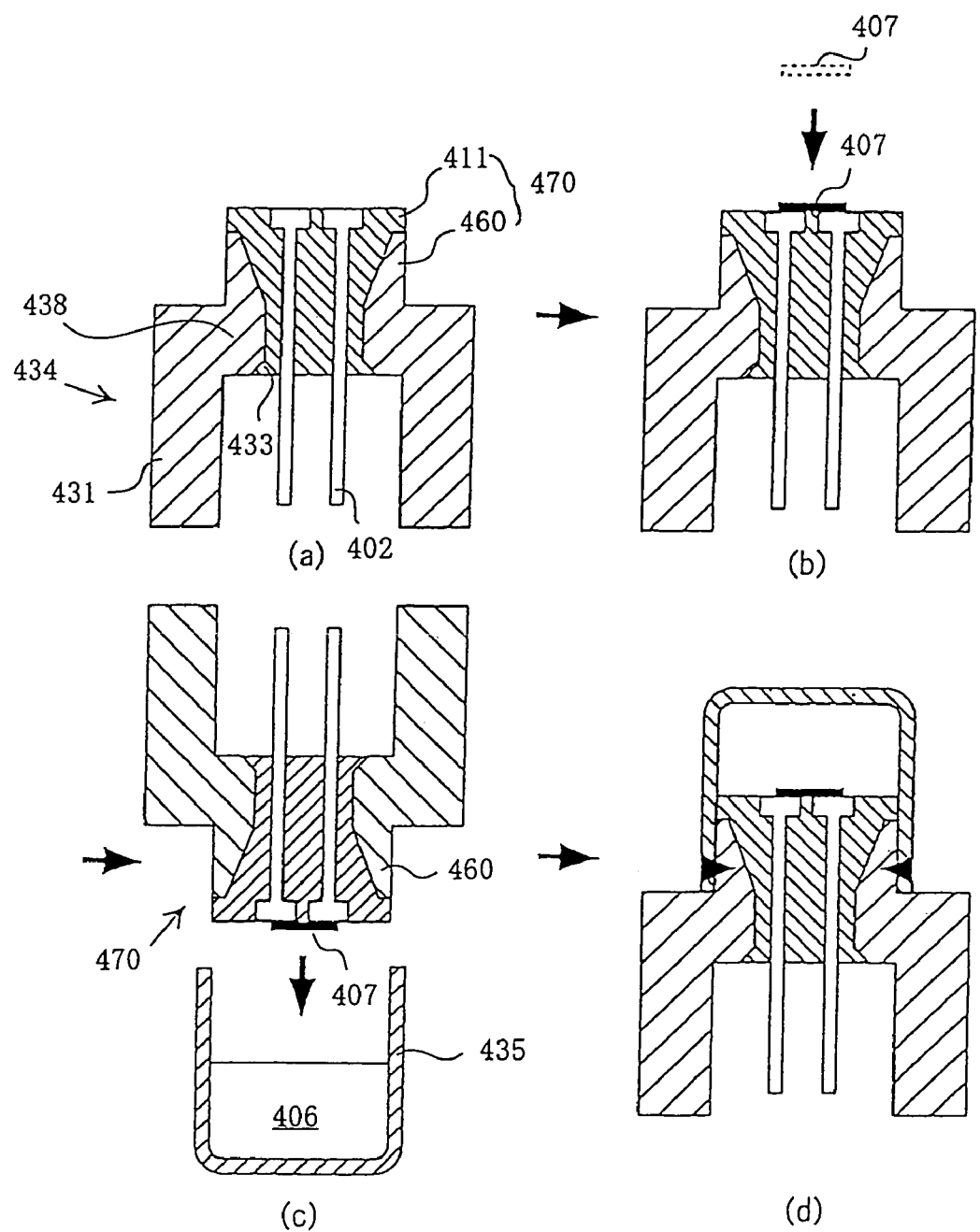
FIG. 15 is a schematic view showing a manufacturing process of the initiator assembly shown in FIG. 14.

The initiator assembly shown in this embodiment can be formed in accordance with the method shown in FIG. 15.

That is, at first, in the same manner as that in (a) of FIG. 12, two conductive pins 402 are inserted from an opening portion of the flange-like portion 438 of the collar member 431 and the insulating material (the resin material) is charged between the opening of the flange-like portion and the conductive pins 402, whereby the base portion 434 is formed ((a) in FIG. 15). However, in this embodiment, as described above, the end surface in the side where the top portion of the conductive pins 402 are exposed is projected cylindrically and outwardly in the axial direction to form the press-loading portion 470 in the base portion 434, and the top portions of the conductive pins 402 are arranged to expose on the end surface of the press-loading portion 470 projecting outwardly in the axial direction of the flange-like portion 438. Further, the bridge wire 407 bridges between the conductive pins 402 whose top portions are exposed on the end surface of the molded member 433 made of the insulating material and is welded ((b) in FIG. 15), and a predetermined amount of priming 406 is weighed and stored in the cover member 435 formed in a cylindrical shape with a top. The press-load portion 470 of the base portion 434 is inserted to the cover member 435 in which the priming 406 is stored from the opening side thereof ((c) in FIG. 15), and the priming 406 in the cover member 435 is press-loaded by the end surface. Then, in the stage that the priming 406 is press-loaded to a sufficient level, the opening of the cover member 435 is horizontally welded to the annular portion 460 in the collar member 431 of the base portion 434 to be joined ((d) in FIG. 15). The cover member 435 and the annular portion 460 are joined by a welding method with a small amount of heat gain such as a resistance welding, a laser welding.

In accordance with the initiator assembly of the present embodiment formed in the above manner, since the priming 406 is weighed and press-loaded by the base portion 434 (the press-loading portion) in the cover member 435, the charge holder 410 used in Embodiments 7 and 8 is not required. Accordingly, it is possible to reduce a cost of the charge holder 410 itself as well as a cost for mounting it, and a process for mounting the charge holder 410 can be omitted.

As a result, an initiator assembly which is more advantageous in a manufacturing process and a manufacturing cost can be realized.

Embodiment 10

As described above, Embodiments 7 to 9 can be applied to a gas generator and an air bag in the same manner as Embodiments 5 and 6.

Embodiment 11

The initiator assembly formed in the above manner can be further used as a constituting part to manufacture a gas generator used in a pretensioner for a seat belt. The gas generator for the pretensioner using the initiator assembly can be manufactured, for example, in accordance with a process shown in (f) to (i) of FIG. 2.

At first, the gas generating agent 22 to be ignited and burnt upon an activation of the initiator, more particularly by a gas, a flame, a mist or the like generated due to combustion of the priming is charged in a cup member 20 formed in a cylindrical shape with a bottom and having the opening end 23 bent in a flange shape ((f) in FIG. 2). Next, a sealant (a sealing member or a waterproof agent) is charged within the circular groove 15 provided in the collar 13 of the initiator assembly in (g) of FIG. 2, the flange portion 23 of the cup member 20 is fitted and inserted into the circular groove, and the circumferential wall of the circular groove 15 is crimped to join the initiator assembly to the tube member (the cup member) 90. At this time, the charge holder 4 side of the initiator assembly is press-inserted into the cup member ((g) to (h) in FIG. 2). Accordingly, the gas generator for the pretensioner is almost completed, however, in FIG. 2, in order to easily and securely connect a connector (not shown) for transmitting the operation signal to the gas generator, the retainer 30 is arranged in the initiator side ((h) in FIG. 2). As the retainer 30, it is possible to use a known structure having a positioning function of the connector to be joined with the conductive pins 2 and having a connector-holding and fixing function.

Figure 18:
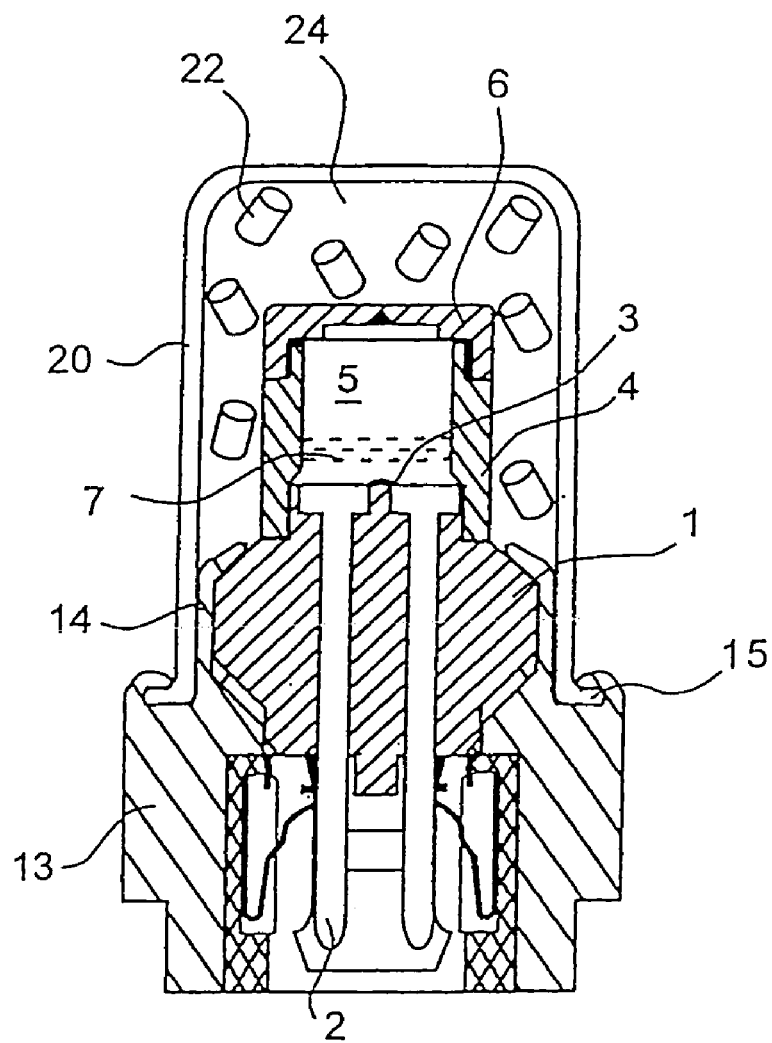
FIG. 18 is a schematic view showing other initiator assembly according to the present invention.

In the gas generator for the pretensioner (FIG. 18) formed in this manner, the initiator is activated by transmitting an igniting electric current to the conductive pin 2 and a flame, a gas, a mist or the like is generated due to the combustion of the priming 7. The flame or the like ignites and burns the gas generating agent 22 stored in the chamber (the combustion chamber 24) inside the cup member 20 so as to generate a working gas. The working gas thereafter breaks the cup member 20 to be discharged outside.

Figure 16:
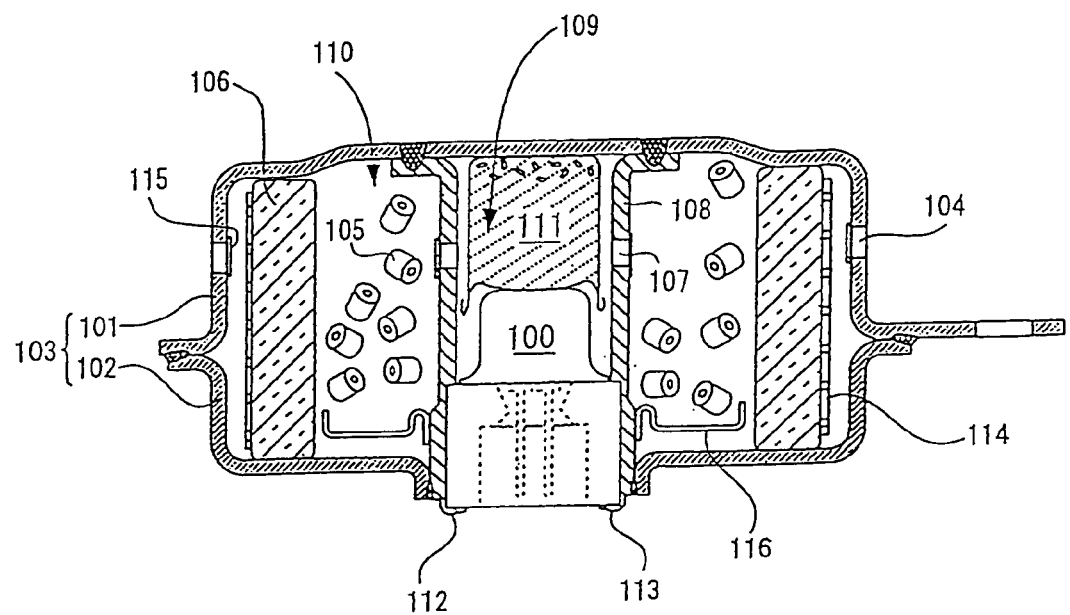
FIG. 16 is a vertical cross sectional schematic view showing other embodiment of a gas generator for an air bag according to the present invention.
Figure 17:
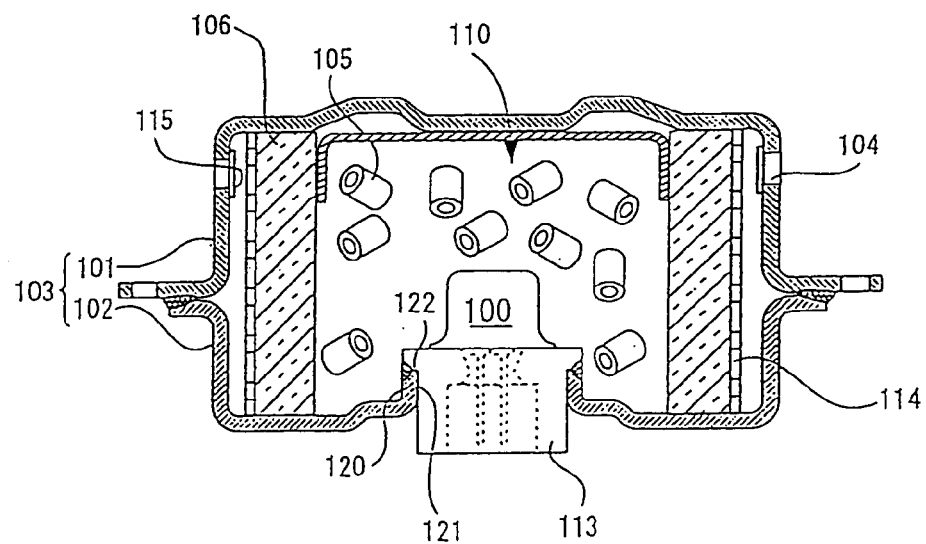
FIG. 17 is a vertical cross sectional schematic view showing other embodiment of a gas generator the present invention.

In particular, as shown in (g) of FIG. 2, the sealant is charged in the connecting portion between the initiator assembly and the cup member, that is, in the circular groove 15 in the present embodiment, whereby it is possible to maintain a moisture proof of the gas generating agent 24 stored in the cup member 20. In FIG. 16, the same reference numerals are attached to the same elements as those in FIGS. 1 and 2.

Embodiment 12

The header closing the end surface of the cavity storing the priming holds a conductive pin for transmitting an electric energy to the bridge wire. The header is preferably formed by using a resin material in which a coefficient of water absorption after being submerged for 24 hours at 23° C. is between 0.005 and 1.0% and a tensile strength (MPa)

is between 100 and 250 MPa. The coefficient of water absorption (after being submerged for 24 hours at 23° C.) of the resin material forming the header portion is more preferably between 0.01 and 0.5%, and further preferably, between 0.01 and 0.1%. Further, the tensile strength (MPa) of the resin material is more preferably 160 to 250 and further preferably 170 to 230.

That is, there is provided the electric type initiator comprising a conductive pin transmitting the electric energy to the bridge wire, and a header holding the conductive pin, in which the header is made of the resin material, and in the resin material, a coefficient of water absorption after being submerged for 24 hours at 23° C. is 0.005 to 1.0% and a tensile strength (MPa) is 100 to 250 MPa.

As the resin material described above, there can be used a polybutylene terephthalate (PBT) or a polyphenylene sulfide (PPS), containing a glass fiber or another inorganic filling materials, or a liquid crystal polymer (LCP) containing an inorganic filling material such as a mineral. At a time of using the resin materials, it is preferable to contain 20 to 80 weight % of a glass fiber in the polybutylene terephthalate (PBT), it is preferable to contain 20 to 80 weight % of a glass fiber in the polyphenylene sulfide (PPS) and it is preferable to contain 20 to 80 weight % of a mineral in the liquid crystal polymer (LCP). In particular, in the case of using a glass reinforced resin containing a glass fiber, desirably, an orientation of the glass fiber is adjusted so as to be along the extending direction of the conductive pin inserted to the header. Further, a percentage content of the inorganic filling material in each of the resin materials is more preferably 30 to 50 weight %.

The header 1 is formed by using a resin material in which a coefficient of water absorption after being submerged for 24 hours at 23° C. is between 0.005 and 1.0% and a tensile strength (MPa) is 100 to 250. As such a resin material, there can be used a polybutylene terephthalate (a coefficient of water absorption after being submerged for 24 hours at 23° C. is 0.07% and a tensile strength is 132 MPa) containing 30 weight % of a glass fiber, a polybutylene terephthalate (a coefficient of water absorption after being submerged for 24 hours at 23° C. is 0.07% and a tensile strength is 156 MPa) containing 45 weight % of a glass fiber, a polyphenylene sulfide (a coefficient of water absorption after being submerged for 24 hours at 23° C. is 0.015% and a tensile strength is 196 MPa) containing 40 weight % of a glass fiber, and a liquid crystal polymer (a coefficient of water absorption after being submerged for 24 hours at 23° C. is 0.04% and a tensile strength is 171 MPa) containing 50 weight % of a mineral.

In the case of making the header of the resin material described above, it is possible to realize an electric type initiator such that it is easily manufactured, a manufacturing cost is reduced, an initial performance is maintained even after being used for a long period of time in a motor vehicle, and it is hardly expanded and compressed.

What is claimed is:

1. A method of forming a header portion in an electric type initiator, said method comprising the steps of:
    providing a cylindrical collar member having an inwardly shaped portion like a flange;
    arranging two conductive pins longitudinally through said collar member; and
    providing an insulating material between said collar member and said conductive pins such that the insulating material includes a hole for interfacing the contacting pins,
    wherein said insulating material is a resin material or a glass material and any bubbles formed on surfaces in the resin material or glass material contacting the conductive pins are no greater than 0.10 mm in diameter in the radial direction and do not go through the header portion in the axial direction.

2. The method of claim 1, wherein said insulating material is a resin that has a coefficient of water absorption after being submerged for 24 hours at 23° C. which is between 0.005 and 3.0% and a tensile strength which is between 100 and 250 MPa.

3. The method of claim 2, wherein the resin has a coefficient of water absorption after being submerged for 24 hours at 23° C. which is between 0.005 and 1.0%.

4. A method of forming a header portion in an electric type initiator comprising the steps of:
    providing a cylindrical collar member having an inwardly shaped portion like a flange;
    arranging two conductive pins longitudinally through said collar member; and
    providing an insulating material between said collar member and said conductive pins such that the insulating material includes a hole for interfacing the contacting pins,
    wherein said insulating material has a dielectric breakdown voltage which is not less than 10 MV/m and wherein any bubbles formed on insulating material surfaces contacting the conductive pins in the header portion are no greater than 0.10 mm in diameter in the radial direction and do not go through the header portion in its axial direction.

5. The method of claim 4, wherein the insulating material is a resin having a coefficient of linear expansion which is not more than $8 \times 10^{-5}$/° C.

6. The method of claim 5 or of claim 2, wherein the resin material is charged between said collar member and said conductive pins by injection-molding.

7. The method of claim 5 or of claim 2, wherein the resin material is charged between said collar member and said conductive pins by melting said resin material and funneling it around said pair of pins.

* * * * *